United States Patent
Chang et al.

(10) Patent No.: US 10,659,360 B2
(45) Date of Patent: *May 19, 2020

(54) ROUTING METHOD, NEAR FIELD COMMUNICATION CONTROLLER, DEVICE HOST, AND TERMINAL

(71) Applicant: Huawei Technologies Co., Ltd., Shenzhen (CN)

(72) Inventors: Xinmiao Chang, Beijing (CN); Jingqing Mei, Beijing (CN); Xiaona Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,537

(22) Filed: May 24, 2019

(65) Prior Publication Data

US 2019/0280973 A1 Sep. 12, 2019

Related U.S. Application Data

(63) Continuation of application No. 15/515,545, filed as application No. PCT/CN2014/087999 on Sep. 30, 2014, now Pat. No. 10,333,844.

(51) Int. Cl.
*H04L 12/28* (2006.01)
*H04L 12/741* (2013.01)
(Continued)

(52) U.S. Cl.
CPC ............. *H04L 45/745* (2013.01); *H04B 5/00* (2013.01); *H04B 5/0031* (2013.01);
(Continued)

(58) Field of Classification Search
CPC ..... H04L 12/28; H04L 12/741; H04L 45/745; H04B 5/0031
See application file for complete search history.

(56) References Cited

U.S. PATENT DOCUMENTS 8,923,763 B2 12/2014 O'Donoghue et al.
9,337,899 B2* 5/2016 Bhatia .................. H04B 5/0031
(Continued)

FOREIGN PATENT DOCUMENTS

CN 102047223 A 5/2011
CN 103222291 A 7/2013
(Continued)

OTHER PUBLICATIONS

"NFC Forum, NFC Controller Interface (NCI)", Technical Specification, Jan. 23, 2014, 167 pages, Version 1.1, NFC Forum.
(Continued)

*Primary Examiner* — Hanh N Nguyen
(74) *Attorney, Agent, or Firm* — Slater Matsil, LLP

(57) ABSTRACT

Embodiments of the present invention provide a routing method, a near field communication controller, a device host, and a terminal, where the method is used in a first terminal, the first terminal includes a device host DH, a near field communication controller NFCC, and at least one near field communication execution environment NFCEE, and the method includes: receiving, by the NFCC, a data frame sent by a second terminal; determining, by the NFCC, whether a default-NFCEE-based routing manner is used to search for a matched routing entry for the data frame; if yes, determining, by the NFCC, a target NFCEE according to the default-NFCEE-based routing manner, so that the NFCC routes the data frame to the target NFCEE.

20 Claims, 12 Drawing Sheets

(51) Int. Cl.
*H04B 5/00* (2006.01)
*H04W 88/02* (2009.01)
*H04W 4/80* (2018.01)
*H04L 12/781* (2013.01)

(52) U.S. Cl.
CPC ............ *H04B 5/0075* (2013.01); *H04W 4/80* (2018.02); *H04W 88/02* (2013.01); *H04L 45/52* (2013.01)

(56) References Cited

U.S. PATENT DOCUMENTS

| | | | |
|---|---|---|---|
| 10,028,078 B2 * | 7/2018 | Nguyen | H04W 12/08 |
| 10,108,948 B2 | 10/2018 | Jin et al. | |
| 10,142,232 B2 | 11/2018 | Mei et al. | |
| 10,333,844 B2 * | 6/2019 | Chang | H04B 5/00 |
| 2009/0247077 A1 | 10/2009 | Sklovsky et al. | |
| 2013/0078920 A1 | 3/2013 | Hillan | |
| 2013/0144793 A1 | 6/2013 | Royston | |
| 2013/0217323 A1 | 8/2013 | Bhatia et al. | |
| 2013/0225073 A1 | 8/2013 | O'Donoghue et al. | |
| 2013/0331029 A1 | 12/2013 | Tang et al. | |
| 2014/0194060 A1 | 7/2014 | Teruyama | |
| 2014/0241348 A1 | 8/2014 | Yadav et al. | |
| 2014/0256252 A1 | 9/2014 | Geslin et al. | |
| 2016/0301606 A1 | 10/2016 | Mei et al. | |
| 2016/0309287 A1 | 10/2016 | Nguyen | |

FOREIGN PATENT DOCUMENTS

| | | |
|---|---|---|
| CN | 103491589 A | 1/2014 |
| CN | 103828408 A | 5/2014 |
| JP | 2012118570 A | 6/2012 |
| WO | 03017103 A1 | 2/2003 |
| WO | 2004029860 A1 | 4/2004 |
| WO | 2013122956 A1 | 8/2013 |

OTHER PUBLICATIONS

NFC Forum, "NFC Controller Interface (NCI) Specification", Technical Specification, Nov. 6, 2012, 146 pages.
Smart Card Alliance Mobile & NFC Council, "Host Card Emulation (HCE) 101", Aug. 2014, 32 pages.

* cited by examiner

ROUTING METHOD, NEAR FIELD COMMUNICATION CONTROLLER, DEVICE HOST, AND TERMINAL

CROSS-REFERENCE TO RELATED APPLICATIONS

This application is a continuation of U.S. patent application Ser. No. 15/515,545, filed on Mar. 29, 2017, which is a national stage of International Application Serial No. PCT/CN2014/087999, filed on Sep. 30, 2014, both of which applications are hereby incorporated herein by reference in their entireties.

TECHNICAL FIELD

The present invention relates to the near field communication field, and in particular, to a routing method, a near field communication controller, a device host, and a terminal.

BACKGROUND

Near field communication (near field communication, NFC for short) is a short-range wireless connection technology based on a radio frequency identification (radio frequency identification, RFID for short) technology, and implements short-distance communication between electronic devices by using magnetic field induction.

A device having an NFC function (NFC device for short) mainly includes the following three functional entities: a device host (device host, DH for short), an NFC controller (NFC controller, NFCC for short), and an NFC execution environment (NFC Execution Environment, NFCEE for short). The DH is responsible for managing the NFCC, for example, initialization, configuration, and power supply management. The NFCC is responsible for performing physical transmission of data by using a radio frequency interface and an antenna. The NFCEE may provide a secure execution environment for an NFC application program. An NFC control interface (NFC control interface, NCI for short) defines a logical interface used for communication between the DH and the NFCC. The DH and the NFCC may communicate with each other by using an NCI protocol. In addition, the NFCC and the NFCEE may communicate with each other by using a communication protocol such as a host controller interface (host controller interface, HCI for short) or the Single Wire Protocol (single wire protocol, SWP for short).

In the prior art, a DH may configure a listen mode routing table for an NFCC, where the listen mode routing table may include any one or more of an AID (Application Identifier, application identifier) based routing entry, an APDU (Application Protocol Data Unit, application protocol data unit) pattern-based routing entry, an NFCID2 (NFC device identifier) based routing entry, a protocol-based routing entry, or a technology-based routing entry. After receiving a data frame sent by a peer NFC device, the NFCC searches for a matched routing entry according to an existing routing mechanism, to find a correct target NFCEE.

According to an existing routing mechanism defined in the stable draft of the NCI 2.0 specification, to find a target NFCEE, the foregoing multiple routing manners may need to be used sequentially, and therefore it is likely to cause a relatively long route selection time and relatively low communication efficiency; furthermore, when the technology-based routing manner or even the protocol-based routing manner is used to select the target NFCEE, it is very likely that the determined target NFCEE is not correct, and therefore communication fails; in addition, when still no correct target NFCEE is found after all routing manners that can be used are used for searching, different NFCC vendors perform different processing according to different implementation manners, and therefore it is likely to cause problems such as chaotic implementation manners and complex implementation solutions.

SUMMARY

Embodiments of the present invention provide a routing method, a near field communication controller, a device host, and a terminal, which can reduce implementation complexity.

According to a first aspect, a routing method is provided, where the method is used in a first terminal, the first terminal includes a device host DH, a near field communication controller NFCC, and at least one near field communication execution environment NFCEE, and the method includes: receiving, by the NFCC, a data frame sent by a second terminal; determining, by the NFCC, whether a default-NFCEE-based routing manner is used to search for a matched routing entry for the data frame; and if yes, determining, by the NFCC, a target NFCEE according to the default-NFCEE-based routing manner, so that the NFCC routes the data frame to the target NFCEE.

With reference to the first aspect, in a first possible implementation manner, the determining, by the NFCC, whether a default-NFCEE-based routing manner is used to search for a matched routing entry for the data frame includes: determining, by the NFCC, whether a default-NFCEE-based routing entry exists.

With reference to the first possible implementation manner, in a second possible implementation manner, the determining, by the NFCC, a target NFCEE according to the default-NFCEE-based routing manner includes: determining, by the NFCC, an NFCEE corresponding to the default-NFCEE-based routing entry as the target NFCEE.

With reference to the first aspect, in a third possible implementation manner, the determining, by the NFCC, whether a default-NFCEE-based routing manner is used to search for a matched routing entry for the data frame includes: determining, by the NFCC, whether a default-NFCEE-based routing entry meeting a current power state exists.

With reference to the third possible implementation manner, in a fourth possible implementation manner, the determining, by the NFCC, a target NFCEE according to the default-NFCEE-based routing manner includes: determining, by the NFCC, an NFCEE corresponding to the default-NFCEE-based routing entry meeting the current power state as the target NFCEE.

With reference to the third or fourth possible implementation manner, in a fifth possible implementation manner, the current power state is one of power states, where the power states include at least one of a power-exhausted state, a power-unexhausted but switched-off state, a screen-on and screen-unlocked state, a screen-on and screen-locked state, a screen-off and screen-unlocked state, and a screen-off and screen-locked state.

With reference to the first aspect or any possible implementation manner of the first to fifth possible implementation manners, in a sixth possible implementation manner, before the determining, by the NFCC, whether a default-NFCEE-based routing manner is used to search for a matched routing entry for the data frame, the method further includes: finding, by the NFCC, no matched routing entry in a routing table according to a preset routing manner.

With reference to the sixth possible implementation manner, in a seventh possible implementation manner, the method further includes: reporting, by the NFCC, a route failure message to the DH, where the route failure message indicates that the NFCC cannot determine the target NFCEE according to the preset routing manner.

With reference to the first aspect or any possible implementation manner of the first to fifth possible implementation manners, in an eighth possible implementation manner, the determining, by the NFCC, whether a default-NFCEE-based routing manner is used to search for a matched routing entry for the data frame further includes: if no, determining, by the NFCC, the target NFCEE according to a preset routing manner, so that the terminal routes the data frame to the target NFCEE.

With reference to any possible implementation manner of the sixth to eighth possible implementation manners, in a ninth possible implementation manner, the preset routing manner includes one of or a combination of multiple of an AID-based routing manner, an APDU pattern-based routing manner, an NFCID2-based routing manner, a protocol-based routing manner, or a technology-based routing manner.

With reference to the first aspect or any possible implementation manner of the first to ninth possible implementation manners, in a tenth possible implementation manner, the default-NFCEE-based routing entry is configured by the DH for the NFCC.

With reference to the first aspect or any possible implementation manner of the first to tenth possible implementation manners, in an eleventh possible implementation manner, the method further includes: reporting, by the NFCC, capability information to the DH, where the capability information includes information indicating that the NFCC supports the default-NFCEE-based routing manner.

According to a second aspect, a routing method is provided, where the method is used in a first terminal, the first terminal includes a device host DH, a near field communication controller NFCC, and at least one near field communication execution environment NFCEE, and the method includes: determining, by the DH, whether the NFCC has a capability of supporting a default-NFCEE-based routing manner; and if yes, configuring, by the DH, a default-NFCEE-based routing entry for the NFCC, so that the NFCC determines a target NFCEE according to the default-NFCEE-based routing entry.

With reference to the second aspect, in a first possible implementation manner, before the determining, by the DH, whether the NFCC has a capability of supporting a default-NFCEE-based routing manner, the method further includes: receiving, by the DH, capability information reported by the NFCC, where the capability information includes information indicating that the NFCC supports the default-NFCEE-based routing manner.

With reference to the second aspect, in a second possible implementation manner, the configuring, by the DH, the default-NFCEE-based routing entry for the NFCC includes: configuring, by the DH, a default-NFCEE for the NFCC, where the default-NFCEE is one of the at least one NFCEE.

With reference to the second aspect, in a third possible implementation manner, the configuring, by the DH, the default-NFCEE-based routing entry for the NFCC includes: configuring, by the DH, the default-NFCEE-based routing entry for the NFCC according to a power state, where the power state includes any one of or a combination of multiple of a power-exhausted state, a power-unexhausted but switched-off state, a screen-on and screen-unlocked state, a screen-on and screen-locked state, a screen-off and screen-unlocked state, or a screen-off and screen-locked state.

With reference to the third possible implementation manner of the second aspect, in a fourth possible implementation manner, the configuring, by the DH, the NFCEE-based routing entry for the NFCC according to a power state includes: separately configuring, by the DH, one NFCEE for at least one power state in the power state; or configuring, by the DH, one NFCEE for multiple power states in the power states.

According to a third aspect, a near field communication controller NFCC is provided, including: a receiving unit, configured to receive a data frame sent by a second terminal; a judging unit, configured to determine whether a default-NFCEE-based routing manner is used to search for a matched routing entry for the data frame; and a first determining unit, configured to determine a target NFCEE according to the default-NFCEE-based routing manner when the judging unit determines that the default-NFCEE-based routing manner is used to search for the matched routing entry for the data frame, so that the NFCC routes the data frame to the target NFCEE.

With reference to the third aspect, in a first possible implementation manner, the judging unit is specifically configured to determine whether a default-NFCEE-based routing entry exists; and the first determining unit is specifically configured to determine, when the judging unit determines that the default-NFCEE-based routing entry exists, an NFCEE corresponding to the default-NFCEE-based routing entry as the target NFCEE.

With reference to the third aspect, in a second possible implementation manner, the judging unit is specifically configured to determine whether a default-NFCEE-based routing entry meeting a current power state exists; and the first determining unit is specifically configured to determine, when the judging unit determines that the default-NFCEE-based routing entry meeting the current power state exists, an NFCEE corresponding to the default-NFCEE-based routing entry meeting the current power state as the target NFCEE.

With reference to the second possible implementation manner, in a third possible implementation manner, the current power state is one of power states, where the power states include at least one of a power-exhausted state, a power-unexhausted but switched-off state, a screen-on and screen-unlocked state, a screen-on and screen-locked state, a screen-off and screen-unlocked state, and a screen-off and screen-locked state.

With reference to the third aspect or any possible implementation manner of the first to third possible implementation manners, in a fourth possible implementation manner, the NFCC further includes: a second determining unit, configured to determine, before the judging unit determines whether the default-NFCEE-based routing manner is used to search for the matched routing entry for the data frame, that no matched routing entry is found in a routing table according to a preset routing manner.

With reference to the fourth possible implementation manner of the third aspect, in a fifth possible implementation manner, the NFCC further includes: a report unit, configured to report a route failure message to the DH, where the route failure message indicates that the second determining unit cannot determine the target NFCEE according to the preset routing manner.

With reference to the third aspect or any possible implementation manner of the first to third possible implementation manners of the third aspect, in a sixth possible implementation manner, the first determining unit is further configured to determine the target NFCEE according to the preset routing manner when the judging unit determines that the default-NFCEE-based routing manner is not used to search for the matched routing entry for the data frame, so that the NFCC routes the data frame to the target NFCEE.

With reference to any possible implementation manner of the fourth to sixth possible implementation manners of the third aspect, in a seventh possible implementation manner, the preset routing manner includes one of or a combination of multiple of an AID-based routing manner, an APDU pattern-based routing manner, an NFCID2-based routing manner, a protocol-based routing manner, or a technology-based routing manner.

With reference to the third aspect or any possible implementation manner of the first to seventh possible implementation manners of the third aspect, in an eighth possible implementation manner, the default-NFCEE-based routing entry is configured by the DH for the NFCC.

With reference to the third aspect or any possible implementation manner of the first to eighth possible implementation manners of the third aspect, in a ninth possible implementation manner, the report unit is further configured to report capability information to the DH, where the capability information includes information indicating that the NFCC supports the default-NFCEE-based routing manner.

According to a fourth aspect, a device host DH is provided, including: a judging unit, configured to determine whether an NFCC has a capability of supporting a default-NFCEE-based routing manner; and a configuration unit, configured to configure a default-NFCEE-based routing entry for the NFCC when the judging unit determines that the NFCC has the capability of supporting the default-NFCEE-based routing manner, so that the NFCC determines a target NFCEE according to the default-NFCEE-based routing entry.

With reference to the fourth aspect, in a first possible implementation manner, the DH further includes: a receiving unit, configured to receive capability information reported by the NFCC, where the capability information includes information indicating that the NFCC supports the default-NFCEE-based routing manner.

With reference to the fourth aspect, in a second possible implementation manner, the configuration unit is specifically configured to configure a default-NFCEE for the NFCC, where the default-NFCEE is one of at least one NFCEE.

With reference to the fourth aspect, in a third possible implementation manner, the configuration unit is specifically configured to configure the default-NFCEE-based routing entry for the NFCC according to a power state, where the power state includes any one of or a combination of multiple of a power-exhausted state, a power-unexhausted but switched-off state, a screen-on and screen-unlocked state, a screen-on and screen-locked state, a screen-off and screen-unlocked state, or a screen-off and screen-locked state.

With reference to the third possible implementation manner of the fourth aspect, in a fourth possible implementation manner, the configuration unit is specifically configured to separately configure one NFCEE for at least one power state in the power state, or specifically configured to configure one NFCEE for multiple power states in the power states.

According to a fifth aspect, a terminal is provided, and the terminal includes a device host DH, a near field communication controller NFCC, and at least one near field communication execution environment NFCEE, where: the DH is configured to configure a default-NFCEE-based routing entry for the NFCC after the DH determines that the NFCC has a capability of supporting a default-NFCEE-based routing manner; and the NFCC is configured to receive a data frame sent by a second terminal, and determine whether the default-NFCEE-based routing manner is used to search for a matched routing entry for the data frame, and if yes, the NFCC determines a target NFCEE according to the default-NFCEE-based routing manner, so that the NFCC routes the data frame to the target NFCEE.

With reference to the fifth aspect, in a first possible implementation manner, the DH is specifically configured to configure a default-NFCEE for the NFCC, where the default-NFCEE is one of the at least one NFCEE; and the NFCC is specifically configured to determine whether a default-NFCEE-based routing entry exists.

With reference to the first possible implementation manner of the fifth aspect, in a second possible implementation manner, the NFCC is specifically configured to determine an NFCEE corresponding to the default-NFCEE-based routing entry as the target NFCEE.

With reference to the fifth aspect, in a third possible implementation manner, the DH is specifically configured to configure the default-NFCEE-based routing entry for the NFCC according to a power state, and the NFCC is specifically configured to determine whether a default-NFCEE-based routing entry meeting a current power state exists.

With reference to the third possible implementation manner of the fifth aspect, in a fourth possible implementation manner, the DH is configured to separately configure one NFCEE for at least one power state in the power state, or the DH configures one NFCEE for multiple power states in the power states.

With reference to the third or fourth possible implementation manner of the fifth aspect, in a fifth possible implementation manner, the NFCC is specifically configured to determine an NFCEE corresponding to the default-NFCEE-based routing entry meeting the current power state as the target NFCEE.

With reference to any possible implementation manner of the third to fifth possible implementation manners of the fifth aspect, in a sixth possible implementation manner, the current power state is one of the power state, where the power state includes at least one of a power-exhausted state, a power-unexhausted but switched-off state, a screen-on and screen-unlocked state, a screen-on and screen-locked state, a screen-off and screen-unlocked state, and a screen-off and screen-locked state.

With reference to the fifth aspect or any possible implementation manner of the first to sixth possible implementation manners of the fifth aspect, in a seventh possible implementation manner, the NFCC is further configured to: determine that no matched routing entry is found in a routing table according to a preset routing manner, and report a route failure message to the DH, where the route failure message indicates that the NFCC cannot determine the target NFCEE according to the preset routing manner.

With reference to the fifth aspect or any possible implementation manner of the first to sixth possible implementation manners of the fifth aspect, in an eighth possible implementation manner, the NFCC is further configured to determine the target NFCEE according to a preset routing manner when it is determined that the default-NFCEE-based routing manner is not used to search for the matched routing entry for the data frame, so that the terminal routes the data frame to the target NFCEE.

With reference to the seventh or eighth possible implementation manner of the fifth aspect, in a ninth possible implementation manner, the preset routing manner includes one of or a combination of multiple of an AID-based routing manner, an APDU pattern-based routing manner, an NFCID2-based routing manner, a protocol-based routing manner, or a technology-based routing manner.

With reference to the fifth aspect or any possible implementation manner of the first to tenth possible implementation manners of the fifth aspect, in an eleventh possible implementation manner, the NFCC is further configured to report capability information to the DH, and the DH is further configured to receive the capability information reported by the NFCC, where the capability information includes information indicating that the NFCC supports the default-NFCEE-based routing manner.

The terminal includes a device host DH, a near field communication controller NFCC, and at least one near field communication execution environment NFCEE, where the NFCC is the NFCC in any implementation manner in the first aspect, the first to ninth possible implementation manners of the first aspect, the third aspect, and the first to ninth possible implementation manners of the third aspect, and the DH is the DH in any implementation manner in the second aspect, the first to fourth possible implementation manners of the second aspect, the fourth aspect, and the first to fourth possible implementation manners of the fourth aspect.

Therefore, in the embodiments of the present invention, an NFCC determines whether a default-NFCEE-based routing manner is used to search for a matched routing entry for a data frame, and if yes, the NFCC determines a target NFCEE according to the default-NFCEE-based routing manner, so that the NFCC routes the data frame to the target NFCEE. Therefore, the NFCC shortens a route selection time under a particular condition, communication efficiency is improved, and accuracy of determining a target NFCEE is improved in specific implementation. An efficient processing method may further be provided for the NFCC when a correct target NFCEE cannot be found by using a preset routing manner. Implementation complexity is simplified.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that in the embodiments of the present invention, a terminal includes user equipment (UE, User Equipment), specifically including but not limited to a mobile station (MS, Mobile Station), a mobile terminal (Mobile Terminal), a mobile telephone (Mobile Telephone), a handset (handset), portable equipment (portable equipment), and the like. The user equipment may communicate with one or more core networks by using a radio access network (RAN, Radio Access Network). For example, the user equipment may be a mobile telephone (or referred to as a "cellular" telephone), a computer having a wireless communication function, or the like. Alternatively, the terminal in the embodiments of the present invention may be a portable, pocket-sized, handheld, computer built-in, or in-vehicle mobile apparatus.

An apparatus for setting a default routing NFCEE disclosed in the present invention may be included in the foregoing terminal.

Figure 1:
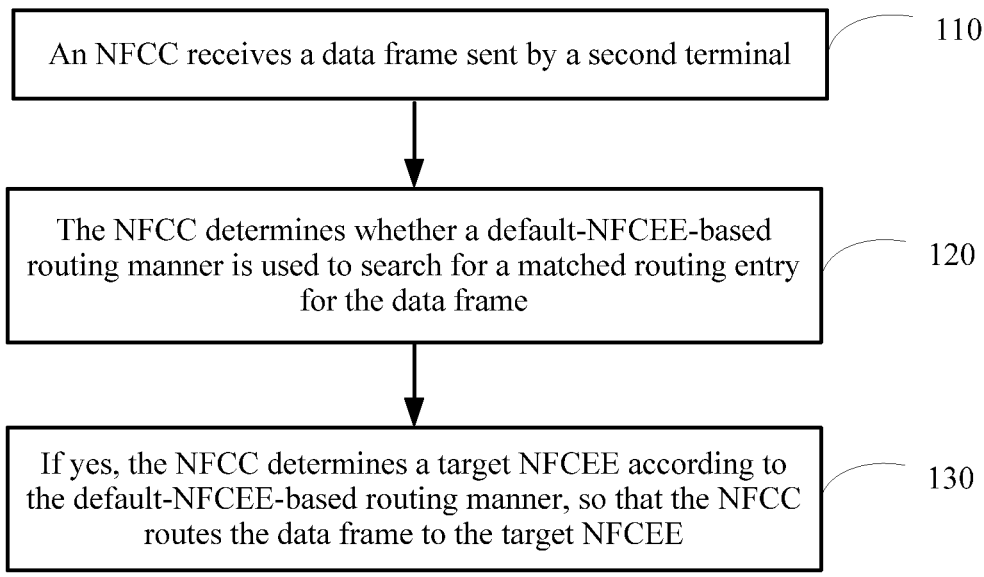
FIG. 1 is a schematic flowchart of a routing method according to an embodiment of the present invention.

FIG. 1 is a schematic flowchart of a routing method according to an embodiment of the present invention. The method shown in FIG. 1 is used in a first terminal, where the first terminal includes a device host DH, a near field communication controller NFCC, and at least one near field communication execution environment NFCEE. The method shown in FIG. 1 is performed by the NFCC. As shown in FIG. 1, the method includes the following steps:

110. The NFCC receives a data frame sent by a second terminal.

Specifically, the second terminal may also be referred to as a peer device. The second terminal may be an NFC device, or a device or an apparatus that has an NFC function.

120. The NFCC determines whether a default-NFCEE-based routing manner is used to search for a matched routing entry for the data frame.

A default-NFCEE-based routing entry is configured by the DH for the NFCC.

130. If yes, the NFCC determines a target NFCEE according to the default-NFCEE-based routing manner, so that the NFCC routes the data frame to the target NFCEE.

Specifically, when the first terminal performs near field communication with the second terminal, the NFCC of the first terminal may receive, by using an antenna, the data frame sent by the second terminal. After receiving the data frame sent by the second terminal, the NFCC may first determine whether the default-NFCEE-based routing manner is used to search for the matched routing entry for the data frame. After determining that the default-NFCEE-based routing manner is used to search for the matched routing entry for the data frame, the NFCC performs routing entry matching in a routing table according to the default-NFCEE-based routing manner to search for the target NFCEE, and routes the data frame to the target NFCEE after the target NFCEE is determined.

Therefore, in this embodiment of the present invention, an NFCC determines whether a default-NFCEE-based routing manner is used to search for a matched routing entry for a data frame, and if yes, the NFCC determines a target NFCEE according to the default-NFCEE-based routing manner, so that the NFCC routes the data frame to the target NFCEE. Because the NFCC may use the default-NFCEE-based routing manner to determine the target NFCEE, it is avoided that different NFCCs process these data frames according to different implementation manners. Therefore, the NFCC shortens a route selection time under a particular condition, communication efficiency is improved, and accuracy of determining a target NFCEE is improved in specific implementation. An efficient processing method may further be provided for the NFCC when a correct target NFCEE cannot be found by using a preset routing manner. Implementation complexity is simplified.

Optionally, in another embodiment, in 120, the NFCC determines whether a default-NFCEE-based routing entry exists. If the default-NFCEE-based routing entry exists, the NFCC determines an NFCEE corresponding to the default-NFCEE-based routing entry as a target NFCEE in 130.

Specifically, the default-NFCEE-based routing entry may be configured by the DH for the NFCC. The NFCEE corresponding to the default-NFCEE-based routing entry may be one of the at least one NFCEE in the first terminal.

In this embodiment of the present invention, it may be directly determined whether a default-NFCEE-based routing entry exists. If the default-NFCEE-based routing entry exists, an NFCEE corresponding to the default-NFCEE-based routing entry is directly determined as a target NFCEE. Therefore, a route selection time is shortened under a particular condition, communication efficiency is improved, specific implementation complexity is simplified, and accuracy of determining a target NFCEE may further be improved in specific implementation.

Alternatively, in another embodiment, in 120, the NFCC determines whether a default-NFCEE-based routing entry meeting a current power state exists. If the default-NFCEE-based routing entry meeting the current power state exists, the NFCC determines an NFCEE corresponding to the default-NFCEE-based routing entry meeting the current power state as a target NFCEE in 130.

The power state includes but is not limited to including at least one of a power-exhausted state, a power-unexhausted but switched-off state, a screen-on and screen-unlocked state, a screen-off and screen-unlocked state, a screen-on and screen-locked state, and a screen-off and screen-locked state defined in the stable draft of the NCI 2.0 specification.

Specifically, the default-NFCEE-based routing entry may also be a routing entry configured by the DH according to a power state. The default-NFCEE-based routing entry includes a routing entry of an NFCEE corresponding to at least one power state in multiple power states of the terminal, where each power state in the at least one power state is corresponding to one NFCEE in at least two NFCEEs. For example, the DH may separately configure different NFCEEs for the NFCC for different power states; or the DH may configure one NFCEE for all power states; or the DH may further configure one NFCEE for a power-exhausted state and configure one NFCEE for a non-power-exhausted state; or the DH may further configure one NFCEE for a power-exhausted state, configure one NFCEE for a screen-on and screen-locked state, and configure one NFCEE for another power state; or the DH may configure one NFCEE for a power-exhausted state and a screen-off and screen-locked state and configure one NFCEE for another state.

Accordingly, the NFCC determines, according to the current power state of the first terminal, the NFCEE corresponding to the default-NFCEE-based routing entry meeting the current power state, and determines the NFCEE as the target NFCEE.

In this embodiment of the present invention, it is determined whether a default-NFCEE-based routing entry meeting a current power state exists, and an NFCC determines an NFCEE corresponding to the default-NFCEE-based routing entry meeting the current power state as a target NFCEE, so that the NFCC routes a data frame to the target NFCEE. Therefore, a route selection time is shortened under a particular condition, communication efficiency is improved, specific implementation complexity is simplified, and accuracy of determining a target NFCEE may further be improved in specific implementation.

Optionally, in another embodiment, before 120, the method in this embodiment of the present invention may further include: finding, by the NFCC, no matched routing entry in a routing table according to a preset routing manner.

Specifically, the NFCC determines whether the default-NFCEE-based routing manner is used to search for the matched routing entry for the data frame only after the NFCC finds no matched NFCEE according to the preset routing manner.

Therefore, in this embodiment of the present invention, an NFCC first determines, according to a preset routing manner, whether a matched routing entry is found in a routing table, and then uses a default-NFCEE-based routing manner to determine a target NFCEE if no matched routing entry is found, so that the NFCC routes a data frame to the target NFCEE. It is avoided that different NFCCs process these data frames according to different implementation manners, specific implementation complexity is simplified, and an efficient processing method is provided for the NFCC when a correct target NFCEE cannot be found by using a preset routing manner.

Further, in another embodiment, the method in this embodiment of the present invention may further include: reporting, by the NFCEE, a route failure message to the DH, where the route failure message indicates that the NFCC cannot determine the target NFCEE according to the preset routing manner.

Specifically, after the NFCC finds no matched NFCEE according to the preset routing manner, the NFCC reports the route failure message to the DH, to trigger the DH to configure a default-NFCEE-based routing entry for the NFCC.

Optionally, in another embodiment, in 120, the determining, by the NFCC, whether a default-NFCEE-based routing manner is used to search for a matched routing entry for the data frame further includes: if no, that is, when the NFCC determines that the default-NFCEE-based routing manner is not used to search for the matched routing entry for the data frame, or when the NFCC finds no matched routing entry for the data frame by using the default-NFCEE-based routing manner, determining, by the NFCC, a target NFCEE according to a preset routing manner, so that the terminal routes the data frame to the target NFCEE.

In this embodiment of the present invention, when the NFCC finds a matched NFCEE routing entry according to a preset routing manner, the NFCC determines an NFCEE corresponding to the routing entry as a target NFCEE, and forwards the received data frame to the target NFCEE.

Specifically, in another embodiment, the preset routing manner includes: one of or a combination of multiple of an AID-based routing manner, an APDU pattern-based routing manner, an NFCID2-based routing manner, a protocol-based routing manner, or a technology-based routing manner.

Optionally, in another embodiment, the default-NFCEE-based routing entry is configured by the DH for the NFCC.

In other words, the method in this embodiment of the present invention may further include: acquiring, by the NFCC, the default-NFCEE-based routing entry configured by the DH.

Further, in another embodiment, the method in this embodiment of the present invention further includes: reporting, by the NFCC, capability information to the DH, where the capability information includes information indicating that the NFCC supports the default-NFCEE-based routing manner.

In other words, before the acquiring, by the NFCC, the default-NFCEE-based routing entry configured by the DH, the method in this embodiment of the present invention further includes: reporting, by the NFCC, the capability information to the DH, where the capability information includes information indicating that the NFCC supports the default-NFCEE-based routing manner.

Specifically, the DH may acquire capability information that is reported by the NFCC to the DH at an initialization stage by using an initialization response (for example, a CORE_INIT_RSP defined in the NCI specification, as shown in the following Table 1), where the capability information includes the information indicating that the NFCC supports the default-NFCEE-based routing manner. The DH determines, according to the capability information, that the NFCC supports the default-NFCEE-based routing manner; then the DH may configure the default-NFCEE-based routing entry for the NFCC; and after receiving the default-NFCEE-based routing entry, the NFCC may determine the target NFCEE from the at least one NFCEE according to the default-NFCEE-based routing manner, so that the NFCC routes the data frame to the target NFCEE.

The foregoing describes in detail the routing method in this embodiment of the present invention from a perspective of an NFCC with reference to FIG. 1. The following describes a routing method in an embodiment of the present invention from a perspective of a DH with reference to FIG. 2.

Figure 2:
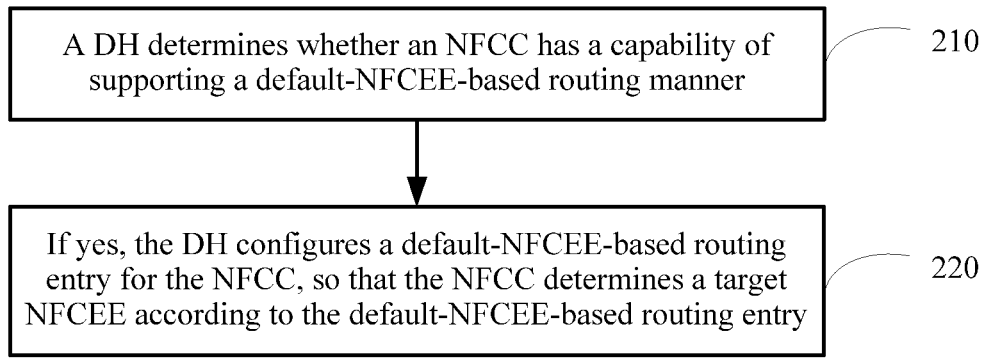
FIG. 2 is a schematic flowchart of a routing method according to another embodiment of the present invention.

FIG. 2 is a schematic flowchart of a routing method according to another embodiment of the present invention. The method shown in FIG. 2 is used in a first terminal, where the first terminal includes a device host DH, a near field communication controller NFCC, and at least two near field communication execution environments NFCEEs. As shown in FIG. 2, the method is performed by the DH. As shown in FIG. 2, the method includes the following steps:

210. The DH determines whether the NFCC has a capability of supporting a default-NFCEE-based routing manner.

Specifically, the DH may determine, by acquiring capability information of the NFCC, that the NFCC has the capability of supporting the default-NFCEE-based routing manner, where the capability information includes information indicating that the NFCC supports the default-NFCEE-based routing manner.

220. If yes, the DH configures a default-NFCEE-based routing entry for the NFCC, so that the NFCC determines a target NFCEE according to the default-NFCEE-based routing entry.

Specifically, at an initialization stage of an NFC device, the device host DH may acquire, by using an NCI-based initialization command/response, for example, a CORE_INIT_CMD/CORE_INIT_RSP, whether the NFCC supports the default-NFCEE-based routing manner; and if it is determined that the NFCC supports the default-NFCEE-based routing manner, the DH may configure a specific default-NFCEE-based routing manner for the NFCC by using a route configuration command (for example, an RF_SET_LISTEN_MODE_ROUTING_CMD), so that the NFCC may perform processing according to the default-NFCEE-based routing manner when the NFCC cannot find a matched routing entry based on a preset routing manner.

Therefore, in this embodiment of the present invention, a DH configures a default-NFCEE-based routing entry for an NFCC, so that the NFCC determines a target NFCEE according to the default-NFCEE-based routing entry. In this embodiment of the present invention, because the NFCC may use a default-NFCEE-based routing manner to determine the target NFCEE, it is avoided that different NFCCs process these data frames according to different implementation manners, thereby reducing implementation complexity. A route selection time may further be shortened under a particular condition, communication efficiency is improved, and accuracy of determining a target NFCEE may further be improved in specific implementation.

Optionally, in another embodiment, before 210, the method in this embodiment of the present invention further includes: receiving, by the DH, capability information reported by the NFCC, where the capability information includes information indicating that the NFCC supports the default-NFCEE-based routing manner.

Specifically, the DH may receive, at an initialization stage, the capability information reported by the NFCC, and the DH may determine, according to the capability information, that the NFCC has the capability of supporting the default-NFCEE-based routing manner. Then, the DH may configure a default-NFCEE-based routing entry for the NFCC, so that the NFCC acquires the default-NFCEE-based routing manner.

Optionally, in another embodiment, in 220, the DH configures a default-NFCEE for the NFCC, where the default-NFCEE is one of the at least one NFCEE.

Alternatively, in another embodiment, in 220, the DH configures a default-NFCEE-based routing entry for the NFCC according to a power state of the terminal, where the power state includes any one of or a combination of multiple of a power-exhausted state, a power-unexhausted but switched-off state, a screen-on and screen-unlocked state, a screen-on and screen-locked state, a screen-off and screen-unlocked state, or a screen-off and screen-locked state.

Further, in another embodiment, in 220, the DH separately configures one NFCEE for at least one power state in the power state, or configures one NFCEE for multiple power states in the power states.

For example, the DH configures a same NFCEE for a power-exhausted state and a power-unexhausted but switched-off state, and configures another NFCEE for a screen-on and screen-unlocked state, a screen-on and screen-locked state, a screen-off and screen-unlocked state, and a screen-off and screen-locked state. For another example, the DH configures a same NFCEE for a power-exhausted state, a power-unexhausted but switched-off state, a screen-on and screen-unlocked state, a screen-on and screen-locked state, a screen-off and screen-unlocked state, and a screen-off and screen-locked state.

In this embodiment of the present invention, after determining that an NFCC supports a default-NFCEE-based routing manner, a DH configures a default-NFCEE-based routing entry for the NFCC, so that the NFCC may use, according to a situation, the default-NFCEE-based routing manner to search for a correct target NFCEE for a received data frame. Therefore, in this embodiment, the NFCC may be enabled to shorten a route selection time under a particular condition, communication efficiency is improved, and accuracy of determining a target NFCEE is improved in specific implementation. An efficient processing method may further be provided for the NFCC when a correct target NFCEE cannot be found by using a preset routing manner. Implementation complexity is simplified.

The foregoing describes in detail the routing method in the embodiment of the present invention from a perspective of an NFCC with reference to FIG. 1, and describes in detail the routing method the embodiment of the present invention from a perspective of a DH with reference to FIG. 2. The following describes in detail a routing method in embodiments of the present invention by using specific examples with reference to FIG. 3 to FIG. 10.

Figure 3:
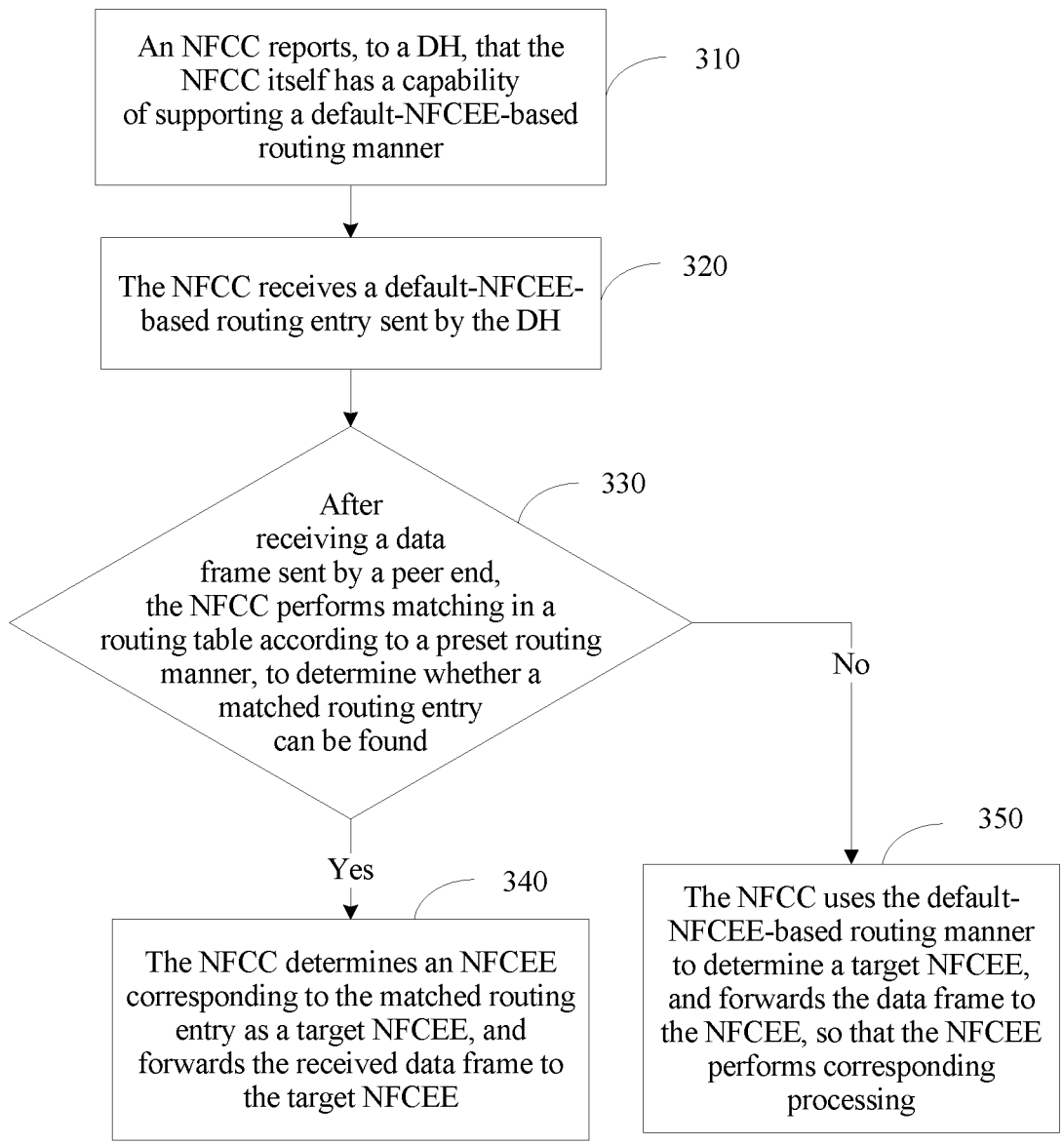
FIG. 3 is a schematic flowchart of a routing method according to another embodiment of the present invention.

FIG. 3 is a schematic flowchart of a routing method according to another embodiment of the present invention. As shown in FIG. 3, the method includes the following steps:

310. An NFCC reports, to a DH, that the NFCC itself has a capability of supporting a default-NFCEE-based routing manner.

Specifically, the NFCC may report capability information to the DH at an initialization stage by using an initialization response (for example, a CORE_INIT_RSP defined in the NCI specification, as shown in the following Table 1), where the capability information includes information indicating that the NFCC supports the default-NFCEE-based routing manner, as shown in the following Table 2.

The following Table 1 shows a structure of the CORE_INIT_RSP, where an NFCC feature field consists of four octets (Octet 0, Octet 1, Octet 2, and Octet 3), and the second octet (that is, Octet 1 shown in the following Table 2) may be used to indicate which routing manner is supported by the NFCC.

In this embodiment, a bit b0 of the second octet may be used to indicate whether the NFCC supports the default-NFCEE-based routing manner. For example, when b0 is 1, it indicates that the NFCC supports the default-NFCEE-based routing manner; otherwise, it indicates that the NFCC does not support the default-NFCEE-based routing manner. Certainly, the present invention is not limited to the report method described in this embodiment. For example, another bit, such as b7 or b6, of Octet 1 may also be used to indicate whether the NFCEE-based routing manner is supported.

TABLE 1

| INITIALIZATION RESPONSE CORE_INIT_RSP | | |
|---|---|---|
| Payload field | Length (Octet Octet) | Value/Description |
| Status | 1 | Refer to Table 125 in the stable draft of the NCI 2.0. |
| NFCC feature | 4 | Refer to the following Table 2. |
| . . . | . . . | . . . |

TABLE 2

| SECOND OCTET (OCTET 1) OF AN NFCC FEATURE | | | | | | | | | |
|---|---|---|---|---|---|---|---|---|---|
| | Bit | | | | | | | | |
| | 7 | 6 | 5 | 4 | 3 | 2 | 1 | 0 | Description |
| Octet 1 | 0 | 0 | | | | | | | Reserved |
| | | | X | | | | | | If b5 is 1, an NFCC supports an APDU pattern-based routing manner; otherwise, an NFCC does not support an APDU pattern-based routing manner. |
| | | | | X | | | | | If b4 is 1, an NFCC supports an NFCID2-based routing manner; otherwise, an NFCC does not support an NFCID2-based routing manner. |
| | | | | | X | | | | If b3 is 1, an NFCC supports an AID-based routing manner; otherwise, an NFCC does not support an AID-based routing manner. |

TABLE 2-continued

SECOND OCTET (OCTET 1) OF AN NFCC FEATURE

| Bit | | | | | | | | Description |
|---|---|---|---|---|---|---|---|---|
| 7 | 6 | 5 | 4 | 3 | 2 | 1 | 0 | |
| | | | | | X | | | If b2 is 1, an NFCC supports a protocol-based routing manner; otherwise, an NFCC does not support a protocol-based routing manner. |
| | | | | | | X | | If b1 is 1, the NFCC supports an AID-based routing manner; otherwise, an NFCC does not support an AID-based routing manner. |
| | | | | | | | X | If b0 is 1, an NFCC supports a default-NFCEE-based routing manner; otherwise, an NFCC does not support a default-NFCEE-based routing manner. |

320. The NFCC receives a default-NFCEE-based routing entry sent by the DH.

Specifically, the default-NFCEE-based routing entry may be an NFCEE configured by the DH. For example, the DH sets an NFCEE of an NFC device as a default-NFCEE. Alternatively, the default-NFCEE-based routing entry may be a routing entry configured by the DH according to a power state, where the power state includes but is not limited to including at least one of a power-exhausted state, a power-unexhausted but switched-off state, a screen-on and screen-unlocked state, a screen-off and screen-unlocked state, a screen-on and screen-locked state, and a screen-off and screen-locked state defined in the stable draft of the NCI 2.0 specification. For example, the DH may separately configure different NFCEEs for different power states; or may configure one NFCEE for all power states; or may configure one NFCEE for a power-exhausted state and configure one NFCEE for a non-power-exhausted state; or may configure one NFCEE for a power-exhausted state, configure one NFCEE for a screen-on and screen-locked state, and configure one NFCEE for another power state; or may configure one NFCEE for a power-exhausted state and a screen-off and screen-locked state and configure one NFCEE for another state.

It should be noted that for the power-exhausted state and the screen-off and screen-locked state, a DH-NFCEE (that is, an NFCEE directly connected to the DH) cannot be set as the default-NFCEE. In addition, the DH may further set the default-NFCEE-based routing entry according to another condition (for example, location information).

For example, a device host DH uses forms shown in the following Table 3 to Table 11 to configure a default routing NFCEE for an NFCC.

In this embodiment, the DH may configure the foregoing default-NFCEE-based routing entry for the NFCC by using a control command for configuring a listen mode routing table (for example, an RF_SET_LISTEN_MODE_ROUTING_CMD defined in the NCI specification, as shown in the following Table 3).

As shown in the following Table 4, four least significant bits are used to indicate a type of a routing entry configured by the DH. In this embodiment, it is assumed that when a value of the four least significant bits is 0x5 (as shown in the following Table 5), it indicates that the foregoing routing entry is a default-NFCEE-based routing entry. If a length of the default-NFCEE-based routing entry is defined as 2 octets, specific content of the routing entry includes an NFCEE identifier (that is, an NFCEE ID) that occupies 1 octet and a power state that occupies 1 octet, as shown in the following Table 6. If a length of the default-NFCEE-based routing entry is 1 octet, specific content of the routing entry includes only an NFCEE ID that occupies 1 octet, as shown in the following Table 7.

TABLE 3

CONTROL COMMAND FOR CONFIGURING A LISTEN MODE ROUTING TABLE
RF_SET_LISTEN_MODE_ROUTING_CMD

| Payload field | Length (Octet Octet) | | Value/Description |
|---|---|---|---|
| More | 1 | | Refer to Table 51 in the stable draft of the NCI 2.0. |
| Quantity of routing entries | 1 | | A value n of the field indicates a quantity n of the following routing entry field. The control command includes at least one routing entry. |
| Routing entry [1 . . . n] | x + 2 | Type | 1 Octet | Type and qualifier: For details, refer to the following Table 4. |
| | | Length | 1 Octet | A value x of the field indicates that an octet occupied by the following value is x. |
| | | Value | x Octets | Value of a routing entry TLV (type-length-value, type-length-value) |

TABLE 4

TYPE-QUALIFIER FIELD VALUE

| Bit | | | | | | | | Description |
|---|---|---|---|---|---|---|---|---|
| b7 | b6 | b5 | b4 | b3 | b2 | b1 | b0 | |
| Octet 0 0 | | | | | | | | Reserved |
| | X | | | | | | | If b6 is 1, it indicates that when the routing entry does not support a current power state, a matched routing entry no longer continues to be searched for, for a data frame received by an NFCC. |
| | | X | | | | | | Applied only to an AID-based routing entry. If b5 is 1, it indicates that when a length of an AID (application identifier) in an application selection command received by an NFCC is less than a length of an AID in the routing entry, partial matching is supported for an AID. |
| | | | X | | | | | Applied only to an AID-based routing entry. If b4 is 1, it indicates that when a length of an AID (application identifier) in an application selection command received by an NFCC is greater than a length of an AID in the routing entry, partial matching is supported for an AID. |
| | | | | X | X | X | X | Indicates a type of the routing entry, which is shown in the following Table 5. |

TABLE 5

TLV CODING FOR A LISTEN MODE ROUTING ENTRY

| Type | Length (Octet) | Value |
|---|---|---|
| 0x0 | 3 | Indicates a technology-based routing entry; for a specific coding manner of a value field, refer to Table 54 defined in the stable draft of the NCI 2.0. |
| 0x1 | 3 | Indicates a protocol-based routing entry; for a specific coding manner of a value field, refer to Table 55 defined in the stable draft of the NCI 2.0. |
| 0x2 | 2 + n | Indicates an AID-based routing entry; for a specific coding manner of a value field, refer to Table 56 defined in the stable draft of the NCI 2.0. |
| 0x3 | 1 | Indicates an NFCID2-based routing entry; for a specific coding manner of a value field, refer to Table 57 defined in the stable draft of the NCI 2.0. |
| 0x4 | 2 + 2n | Indicates an APDU pattern-based routing entry; for a specific coding manner of a value field, refer to Table 58 defined in the stable draft of the NCI 2.0. |
| 0x5 | m | Indicates a default-NFCEE-based routing entry; for a specific coding manner of a value field, refer to the following Table 6. |
| 0x6-0x9 | | Reserved |
| 0xA-0xF | | Reserved |

In this embodiment, when the type in the foregoing Table 5 is 0x5 and a corresponding length m is 2 octets, a corresponding value field is shown in the following Table 6:

TABLE 6

VALUE FIELD OF A DEFAULT-NFCEE-BASED ROUTING ENTRY

| Payload field | Length (Octet octet) | Value/Description |
|---|---|---|
| Route | 1 | A value of the field indicates an NFCEE identifier. For details, refer to Table 112 defined in the stable draft of the NCI 2.0. |
| Power state | 1 | Refer to Table 59 defined in the stable draft of the NCI 2.0. |

In this embodiment, when the type in the foregoing Table 5 is 0x5 and a corresponding length m is 1 octet, a corresponding value field is shown in the following Table 7:

TABLE 7

VALUE FIELD OF A DEFAULT-NFCEE-BASED ROUTING ENTRY

| Payload field | Length (Octet octet) | Value/Description |
|---|---|---|
| Route | 1 | A value of the field indicates an NFCEE identifier. For details, refer to Table 112 defined in the stable draft of the NCI 2.0. |

Certainly, the present invention is not limited to the configuration method shown in the foregoing Table 3 to Table 7 in this embodiment. The DH may further configure the default-NFCEE-based routing entry by using another method, for example, independently configure the foregoing NFCEE-based routing entry by using a dedicatedly defined control command (for example, an RF_SET_DEFAULT_NFCEE_CMD shown in the following Table 8), which is independent from a routing entry in a listen mode routing table that is defined in the existing NCI specification and configured by the DH for the NFCC. Accordingly, a time for configuring the routing entry may also be irrelevant to a configuration time defined in the existing NCI specification.

It should be noted that another configuration method shown in the following Table 8 to Table 11 is merely an example in the present invention.

TABLE 8

CONTROL COMMAND FOR CONFIGURING AN NFCEE-BASED ROUTING ENTRY
RF_SET_DEFAULT_NFCEE_CMD

| Payload field | Length (Octet Octet) | | | Value/Description |
|---|---|---|---|---|
| More | 1 | | | Refer to Table 51 in the stable draft of the NCI 2.0. |
| Quantity of default-NFCEE-based routing entries | 1 | | | A value n of the field indicates a quantity n of the following routing entry field. The control command includes at least one routing entry. |
| Default-NFCEE-based routing entry [1 ... n] | x + 2 | Type | 1 Octet | Type and qualifier: For details, refer to the following Table 9. |
| | | Length | 1 Octet | A value x of the field indicates that an octet occupied by the following value is x. |
| | | Value | x Octets | Value of a routing entry TLV (type-length-value, type-length-value) |

TABLE 9

TYPE-QUALIFIER FIELD VALUE

| | Bit | | | | | | | | Description |
|---|---|---|---|---|---|---|---|---|---|
| | b7 | b6 | b5 | b4 | b3 | b2 | b1 | b0 | |
| Octet 0 | 0 | | | | | | | | Reserved |
| | | X | | | | | | | If b6 is 1, it indicates that when the routing entry does not support a current power state, a matched routing entry no longer continues to be searched for, for a data frame received by an NFCC. |
| | | | X | X | | | | | Reserved |
| | | | | | X | X | X | X | If the type-qualifier field value is set to 1111b, it indicates that the routing entry is the default-NFCEE-based routing entry. |

When x in the foregoing Table 9 is 2, specific content of the default-NFCEE-based routing entry is shown in the following Table 10:

TABLE 10

VALUE FIELD OF A DEFAULT-NFCEE-BASED ROUTING ENTRY

| Payload field | Length (Octet octet) | Value/Description |
|---|---|---|
| Route | 1 | A value of the field indicates an NFCEE identifier. For details, refer to Table 112 defined in the stable draft of the NCI 2.0. |
| Power state | 1 | Refer to Table 59 defined in the stable draft of the NCI 2.0. |

Alternatively, when x in the foregoing Table 9 is 1, specific content of the default-NFCEE-based routing entry is shown in the following Table 11:

TABLE 11

VALUE FIELD OF THE DEFAULT-NFCEE-BASED ROUTING ENTRY

| Payload field | Length (Octet octet) | Value/Description |
|---|---|---|
| Route | 1 | A value of the field indicates an NFCEE identifier. For details, refer to Table 112 defined in the stable draft of the NCI 2.0. |

It should be noted that for a control command RF_SET_DEFAULT TARGET_NFCEE_CMD shown in the foregoing Table 8, a corresponding response may be set as an RF_SET_DEFAULT_NFCEE_RSP, where a status identifier indicating whether the configuration is successful, and the like are included. Multiple specific definition manners and implementation manners may exist, which are not specifically described herein.

330. After receiving a data frame sent by a peer end, the NFCC performs matching in a routing table according to a preset routing manner, to determine whether a matched routing entry can be found.

Specifically, if the NFCC can find the matched routing entry, step 340 is performed; if the NFCC finds no matched routing entry, step 350 is performed.

Specifically, multiple preset routing manners may exist. For details, refer to specific examples shown in the following FIG. 4 to FIG. 8.

340. The NFCC determines an NFCEE corresponding to the matched routing entry as a target NFCEE, and forwards the received data frame to the target NFCEE.

350. The NFCC uses the default-NFCEE-based routing manner to determine a target NFCEE, and forwards the data frame to the NFCEE, so that the NFCEE performs corresponding processing.

In this embodiment, the NFCC determines a target NFCEE according to the NFCEE-based routing entry that is described in the foregoing step 320 and configured by the DH. If the DH configures only one NFCEE as a default-NFCEE, the NFCC determines the default-NFCEE as the target NFCEE. If the DH configures the NFCEE-based routing entry according to a power state as described above, the NFCC may search for an NFCEE-based routing entry meeting a current power state, to determine an NFCEE corresponding to the routing entry as the target NFCEE.

Specifically, after determining the target NFCEE, the NFCC may transmit the data frame from the peer device to the target NFCEE according to a protocol, for example, a host controller interface (HCI) protocol/the Single Wire Protocol (SWP), used between the NFCC and the NFCEE.

Specifically, in step 330, multiple preset routing manners may exist. The following describes step 330 in detail with reference to specific examples in FIG. 4 to FIG. 8.

Figure 4:
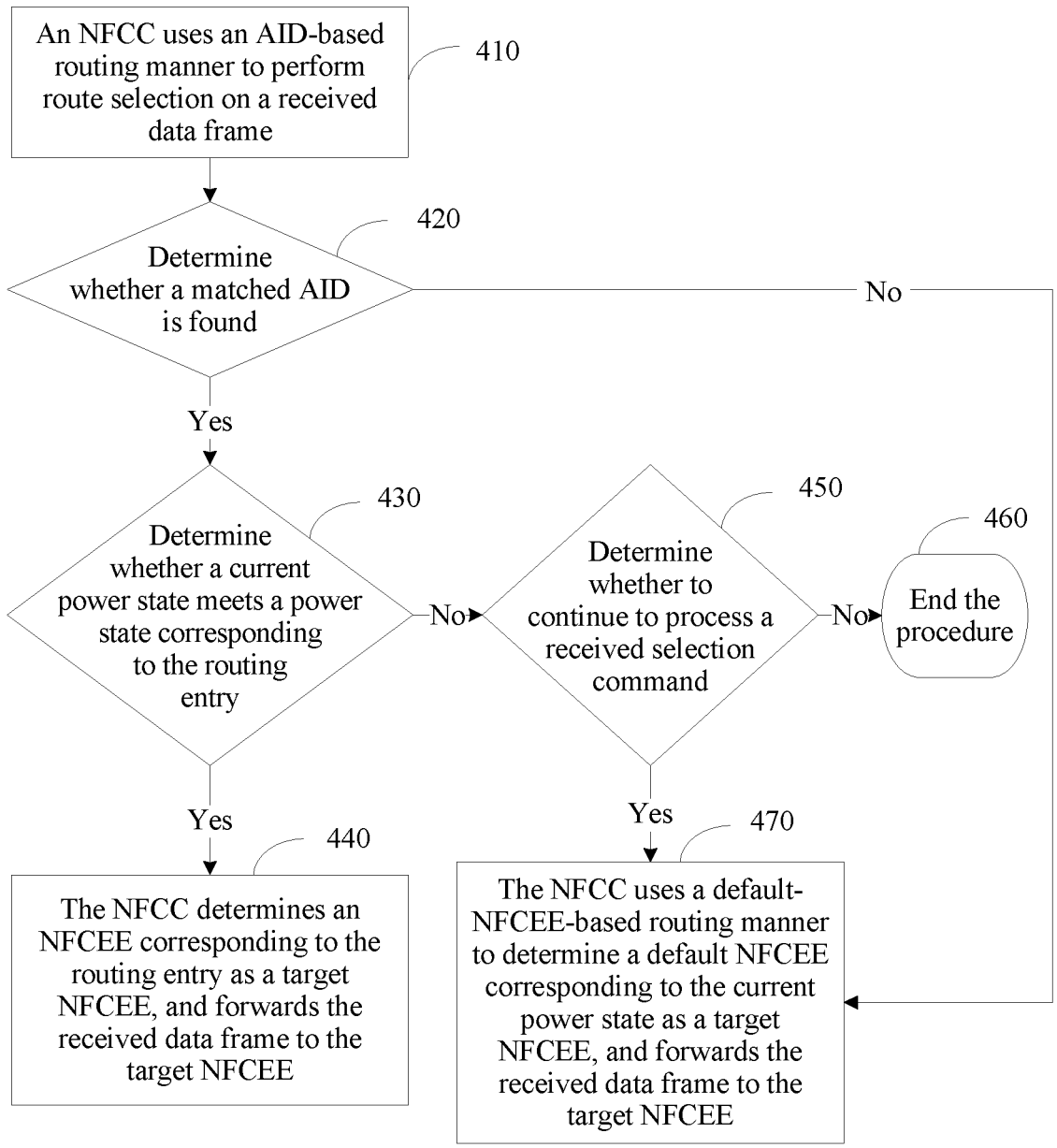
FIG. 4 is a schematic flowchart of a method for matching a routing entry according to a preset routing manner according to an embodiment of the present invention.

In 330, the NFCC may use an AID-based routing manner to perform routing entry matching, to determine whether an AID included in the data frame has a corresponding AID routing entry in the routing table. Specifically, if still no matched routing entry is found after the NFCC has completed matching of all AID routing entries, the default-NFCEE-based routing manner can be used to route the data frame to the configured default-NFCEE for processing. Specifically, as shown in FIG. 4, the following steps are included:

410. The NFCC uses an AID-based routing manner to perform route selection on the received data frame.

420. Determine whether a matched AID is found.

Specifically, the NFCC determines whether the matched AID is found; if a matched AID is found, step 430 is performed; otherwise, step 470 is performed.

430. Determine whether a current power state meets a power state corresponding to the routing entry.

Specifically, the NFCC determines whether a bit, in a routing entry corresponding to the matched AID, indicating the current power state is 1 (this example is merely used for description); if yes, step 440 is performed; otherwise, step 450 is performed.

440. The NFCC determines an NFCEE corresponding to the routing entry as a target NFCEE, and forwards the received data frame to the target NFCEE.

450. Determine whether to continue to process a received selection command.

Specifically, if yes, step 470 is performed; otherwise, step 460 is performed.

460. End the procedure.

Specifically, route selection is ended.

470. The NFCC uses the default-NFCEE-based routing manner to determine a default-NFCEE corresponding to the current power state as a target NFCEE, and forwards the received data frame to the target NFCEE.

It should be noted that step 440 is corresponding to step 340, and step 470 is corresponding to step 350. To avoid repetition, details are not described herein.

Figure 5:
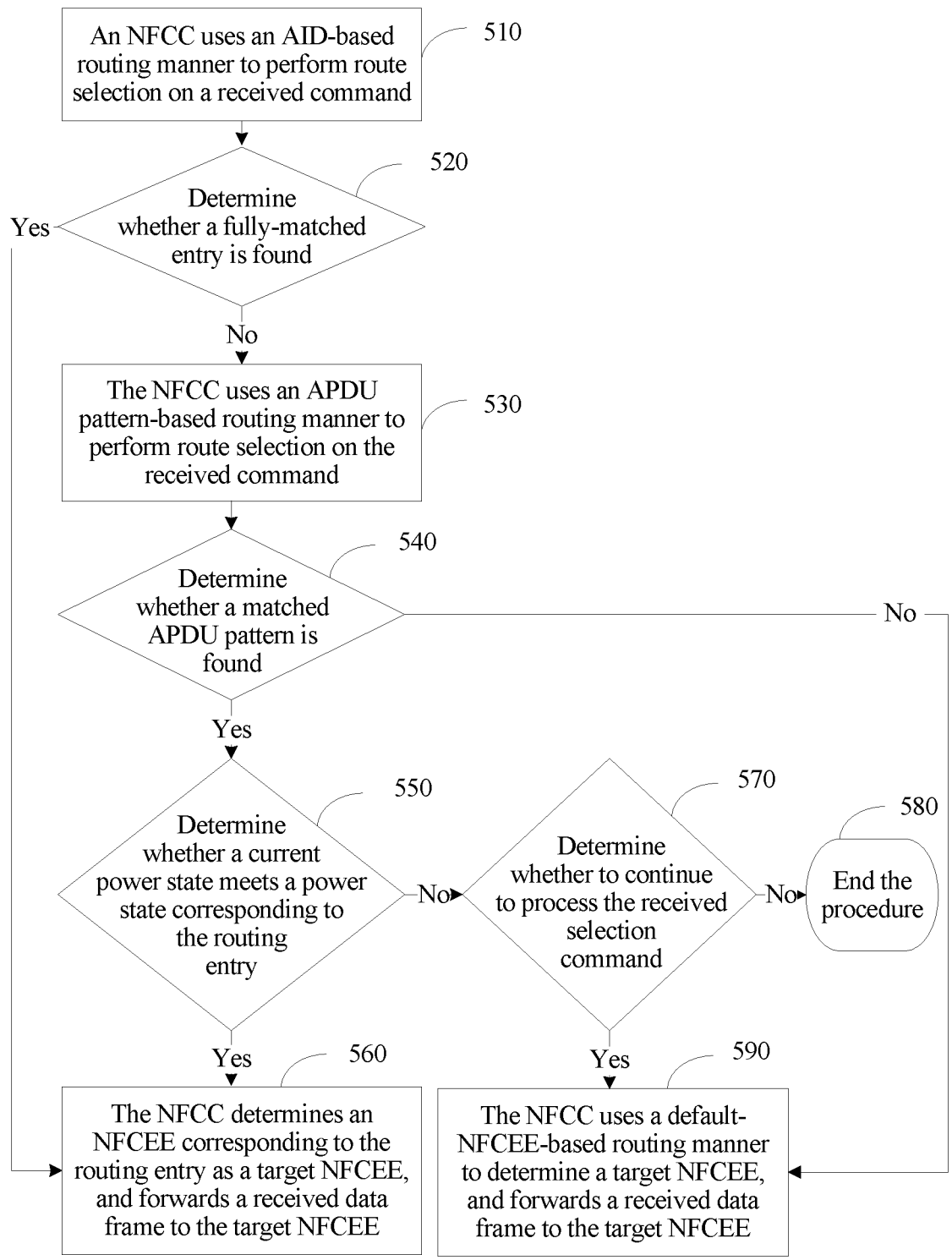
FIG. 5 is a schematic flowchart of a method for matching a routing entry according to a preset routing manner according to an embodiment of the present invention.

Alternatively, in step 330, the NFCC may further use an AID-based routing manner and an APDU pattern-based routing manner to perform routing entry matching, to determine whether an APDU pattern corresponding to the data frame has a corresponding routing entry in the routing table. Specifically, if no matched NFCEE is found after the NFCC has completed matching of all AID routing entries, NFCEE routing is performed according to the APDU pattern-based routing manner. If still no matched routing entry is found after the NFCC has completed matching of all APDU patterns, the default-NFCEE-based routing manner may be used to determine a target NFCEE, to route the data frame to the target NFCEE for processing. Specifically, as shown in FIG. 5, the following steps are included:

510. The NFCC uses an AID-based routing manner to perform route selection on a received command.

520. Determine whether a fully-matched entry is found.

Specifically, the NFCC determines whether the fully-matched entry is found; if yes, step 560 is performed; otherwise, step 530 is performed.

It should be noted that in this embodiment, the fully-matched entry may be understood as follows: The AID in the data frame in step 410 matches an AID in an AID-based routing entry (that is, lengths are equal, and values of AIDs are the same; or lengths are not equal but a value of a shorter AID is the same as a value of an equal-length byte at the beginning of a longer AID), and a bit, in a power state field of the routing entry, indicating a current power state is set to 1 (that a bit, in a power state field of the routing entry, indicating a current power state is set to 1 as defined in the NCI specification is merely used as an example for description).

530. The NFCC uses an APDU pattern-based routing manner to perform route selection on the received command.

540. Determine whether a matched APDU pattern is found.

Specifically, the NFCC uses the APDU pattern-based routing manner to perform route selection on the received command, and determines whether the matched APDU pattern is found. If yes, step 550 is performed; otherwise, step 590 is performed.

550. Determine whether a current power state meets a power state corresponding to the routing entry.

Specifically, the NFCC determines whether a bit, in a routing entry corresponding to the matched APDU pattern, indicating the current power state is 1; if yes, step 560 is performed; otherwise, step 570 is performed.

560. The NFCC determines an NFCEE corresponding to the routing entry as a target NFCEE, and forwards the received data frame to the target NFCEE.

570. Determine whether to continue to process the received selection command.

Specifically, the NFCC determines whether to continue to process the received selection command; if yes, step 590 is performed; otherwise, step 580 is performed.

580. End the procedure.

Specifically, route selection is ended.

590. The NFCC uses the default-NFCEE-based routing manner to determine a target NFCEE, and forwards the received data frame to the target NFCEE.

It should be noted that step 560 is corresponding to step 340, and step 590 is corresponding to step 350. To avoid repetition, details are not described herein.

Figure 6:
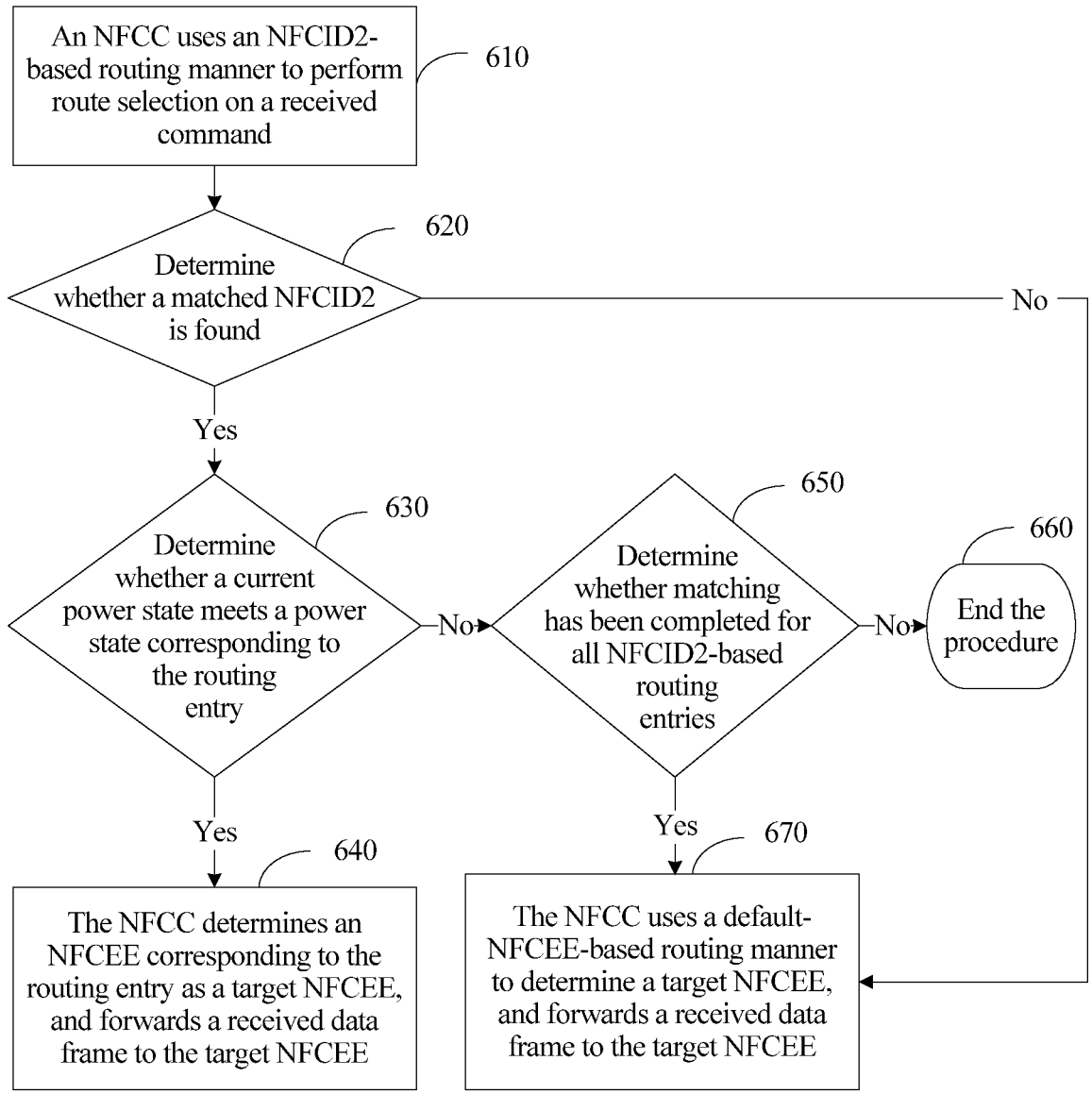
FIG. 6 is a schematic flowchart of a method for matching a routing entry according to a preset routing manner according to an embodiment of the present invention.

Alternatively, in step 330, the NFCC may use an NFCID2-based routing manner to perform routing entry matching, to determine whether a current power state of a terminal meets a power state set for the NFCID2 routing entry, or determine whether an NFCID2 corresponding to the data frame has a corresponding routing entry in the routing table. For example, when the NFCC receives the data frame by using an NFC-F technology according to the Type 3 Tag protocol, the NFCID2-based routing manner may be used. Specifically, if still no fully-matched routing entry is found after the NFCC has completed matching of all NFCID2 routing entries, the default-NFCEE-based routing manner can be used to determine a target NFCEE, to route the data frame to the target NFCEE. Specifically, as shown in FIG. 6, the following steps are included:

610. The NFCC uses an NFCID2-based routing manner to perform route selection on a received command.

620. Determine whether a matched NFCID2 is found.

Specifically, the NFCEE determines whether the matched NFCID2 is found; if yes, step 630 is performed; otherwise, step 670 is performed.

630. Determine whether a current power state meets a power state corresponding to the routing entry.

Specifically, the NFCEE determines whether a bit, in a routing entry corresponding to the matched APDU pattern, indicating the current power state is 1; if yes, step 640 is performed; otherwise, step 650 is performed.

640. The NFCC determines an NFCEE corresponding to the routing entry as a target NFCEE, and forwards the received data frame to the target NFCEE.

650. Determine whether matching has been completed for all NFCID2-based routing entries.

Specifically, the NFCC determines whether matching has been completed for all the NFCID2-based routing entries; if yes, step 670 is performed; otherwise, step 660 is performed.

660. End the procedure.

Specifically, route selection is ended.

670. The NFCC uses the default-NFCEE-based routing manner to determine a default-NFCEE corresponding to the current power state as a target NFCEE, and forwards the received data frame to the target NFCEE.

It should be noted that step 640 is corresponding to step 340, and step 670 is corresponding to step 350. To avoid repetition, details are not described herein.

Figure 7:
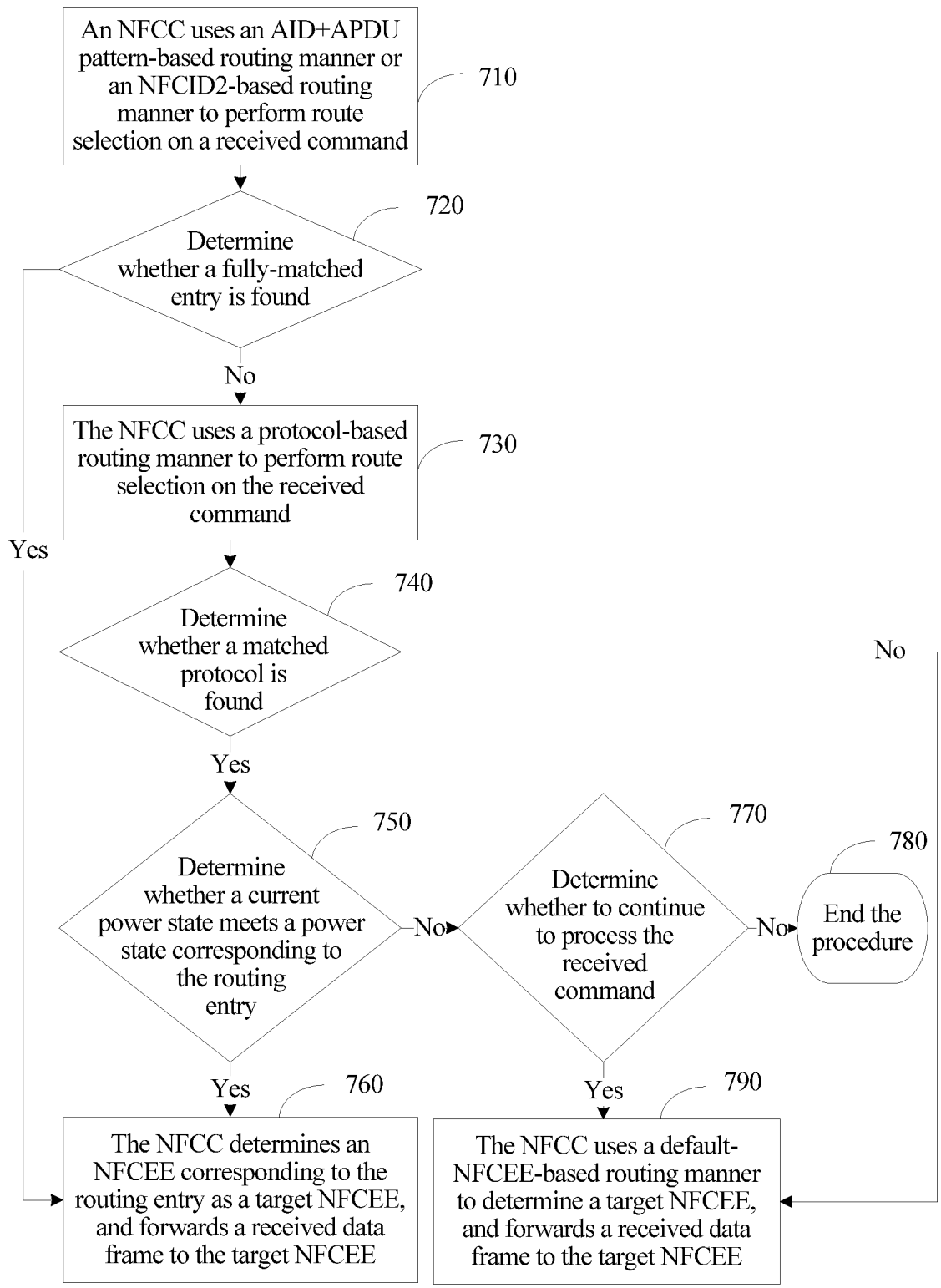
FIG. 7 is a schematic flowchart of a method for matching a routing entry according to a preset routing manner according to an embodiment of the present invention.

Alternatively, in step 330, the NFCC uses a combination routing manner of an AID-based routing manner, an APDU pattern-based routing manner, and a protocol-based routing manner, or uses a combination routing manner of an NFCID2-based routing manner and a protocol-based routing manner to perform routing entry matching, and then determines whether a protocol with which the data frame complies has a corresponding protocol routing entry in the routing table. If still no fully-matched routing entry is found after the NFCC has completed matching of all routing entries in the routing table, the default-NFCEE-based routing manner can be used to determine a target NFCEE, to route the data frame to the target NFCEE. Specifically, as shown in FIG. 7, the following steps are included:

710. The NFCC uses an AID+APDU pattern-based routing manner or an NFCID2-based routing manner to perform route selection on a received command.

720. Determine whether a fully-matched entry is found.

Specifically, the NFCC determines whether the fully-matched entry is found; if yes, step 760 is performed; otherwise, step 730 is performed.

It should be noted that understanding of the fully-matched entry described in this embodiment is the same as that of the fully-matched entry described in step 520, and details are not described herein.

730. The NFCC uses a protocol-based routing manner to perform route selection on the received command.

740. Determine whether a matched protocol is found.

Specifically, the NFCC determines whether the matched protocol is found by using the protocol-based routing manner to perform route selection on the received command; if yes, step 750 is performed; otherwise, step 740 is performed.

750. Determine whether a current power state meets a power state corresponding to the routing entry.

Specifically, the NFCC determines whether the current power state matches a power state corresponding to the matched protocol; if yes, step 760 is performed; otherwise, step 770 is performed.

760. The NFCC determines an NFCEE corresponding to the routing entry as a target NFCEE, and forwards the received data frame to the target NFCEE.

770. Determine whether to continue to process the received command.

Specifically, the NFCC determines whether to continue to process the received command; if yes, step 790 is performed; otherwise, step 780 is performed.

780. End the procedure.

Specifically, route selection is ended.

790. The NFCC uses the default-NFCEE-based routing manner to determine a default-NFCEE corresponding to the current power state as a target NFCEE, and forwards the received data frame to the target NFCEE.

It should be noted that step 760 is corresponding to step 340, and step 790 is corresponding to step 350. To avoid repetition, details are not described herein.

Figure 8:
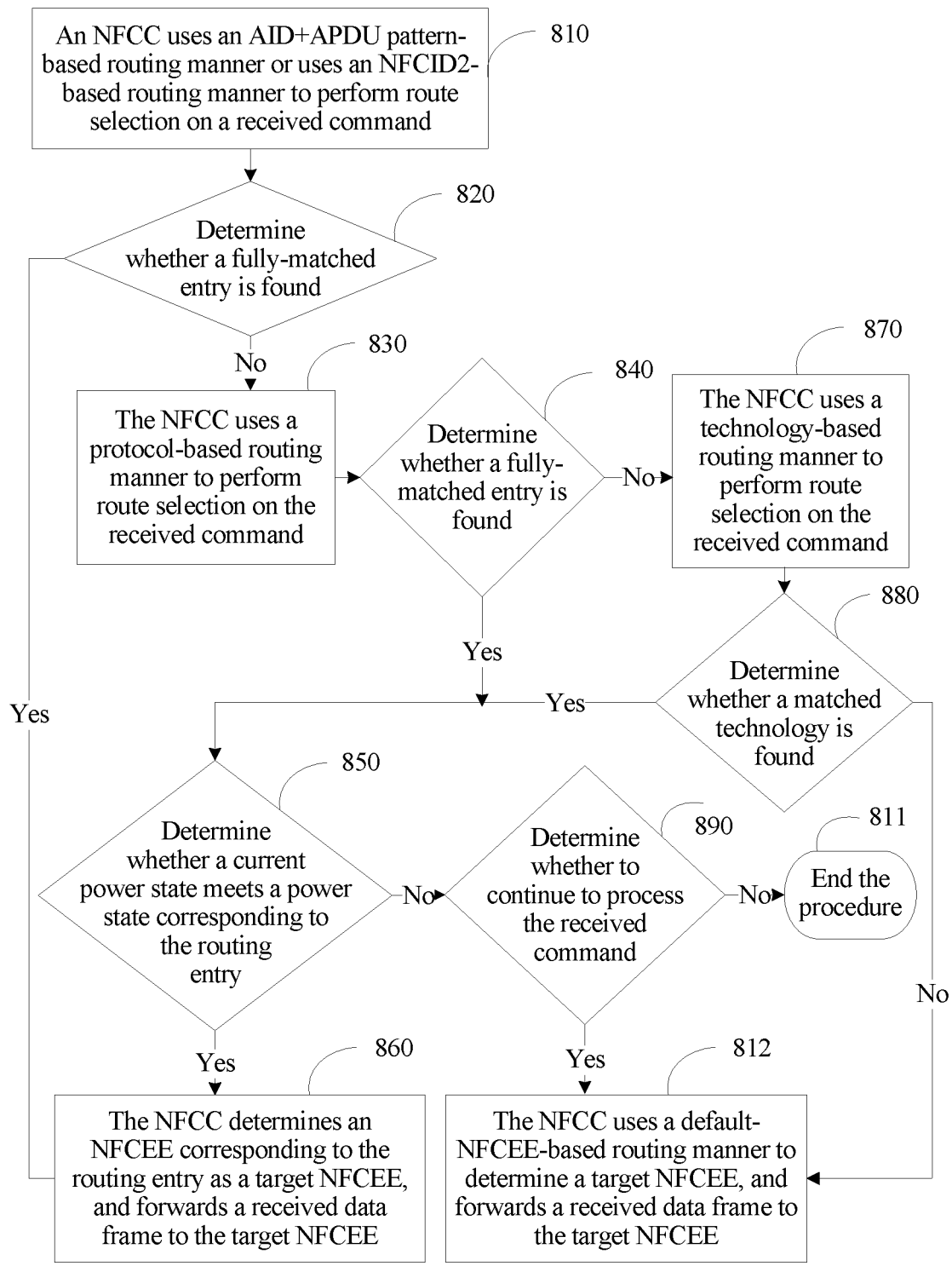
FIG. 8 is a schematic flowchart of a method for matching a routing entry according to a preset routing manner according to an embodiment of the present invention.

Alternatively, in step 330, the NFCC may use a combination routing manner of an AID-based routing manner, an APDU pattern-based routing manner, a protocol-based routing manner, and a technology-based routing manner, or use a combination routing manner of an NFCID2-based routing manner, a protocol-based routing manner, and use a technology-based routing manner to perform routing entry matching, and then determine whether a technology with which the data frame complies has a corresponding technology routing entry in the routing table. If still no fully-matched routing entry is found after the NFCC has completed matching of all routing entries in the routing table, the default-NFCEE-based routing manner can be used to determine a target NFCEE, to route the data frame to the target NFCEE. Specifically, as shown in FIG. 8, the following steps are included:

810. The NFCC uses an AID+APDU pattern-based routing manner or uses an NFCID2-based routing manner to perform route selection on a received command.

820. Determine whether a fully-matched entry is found.

Specifically, the NFCC determines whether the fully-matched entry is found; if yes, step 860 is performed; otherwise, step 830 is performed.

It should be noted that understanding of the fully-matched entry described in this embodiment is the same as that of the fully-matched entry described in step 520, and details are not described herein.

830. The NFCC uses a protocol-based routing manner to perform route selection on the received command.

840. Determine whether a fully-matched entry is found.

Specifically, the NFCC determines whether the fully-matched entry is found; if yes, step 850 is performed; otherwise, step 870 is performed.

850. Determine whether a current power state meets a power state corresponding to the routing entry.

Specifically, the NFCC determines whether the current power state meets the power state corresponding to the routing entry; if yes, step 860 is performed; otherwise, step 890 is performed.

860. The NFCC determines an NFCEE corresponding to the routing entry as a target NFCEE, and forwards the received data frame to the target NFCEE.

870. The NFCC uses a technology-based routing manner to perform route selection on the received command.

880. Determine whether a matched technology is found.

Specifically, the NFCC determines whether the matched technology is found; if yes, step 850 is performed; otherwise, step 812 is performed.

890. Determine whether to continue to process the received command.

811. End the procedure.

Specifically, route selection is ended.

812. The NFCC uses the default-NFCEE-based routing manner to determine a default-NFCEE corresponding to the current power state as a target NFCEE, and forwards the received data frame to the target NFCEE.

It should be noted that step 860 is corresponding to step 340, and step 812 is corresponding to step 350. To avoid repetition, details are not described herein.

Therefore, with reference to FIG. 3 to FIG. 8, in this embodiment of the present invention, an NFCC first acquires a default-NFCEE-based routing entry, then determines, according to a preset routing manner, whether a matched routing entry is found in a routing table, and if no matched routing entry is found, uses a default-NFCEE-based routing manner to determine a target NFCEE, so that the NFCC routes a data frame to the target NFCEE. It is avoided that different NFCCs process these data frames according to different implementation manners, specific implementation complexity is simplified, and an efficient processing method is provided for the NFCC when a correct target NFCEE cannot be found by using a preset routing manner.

Figure 9:
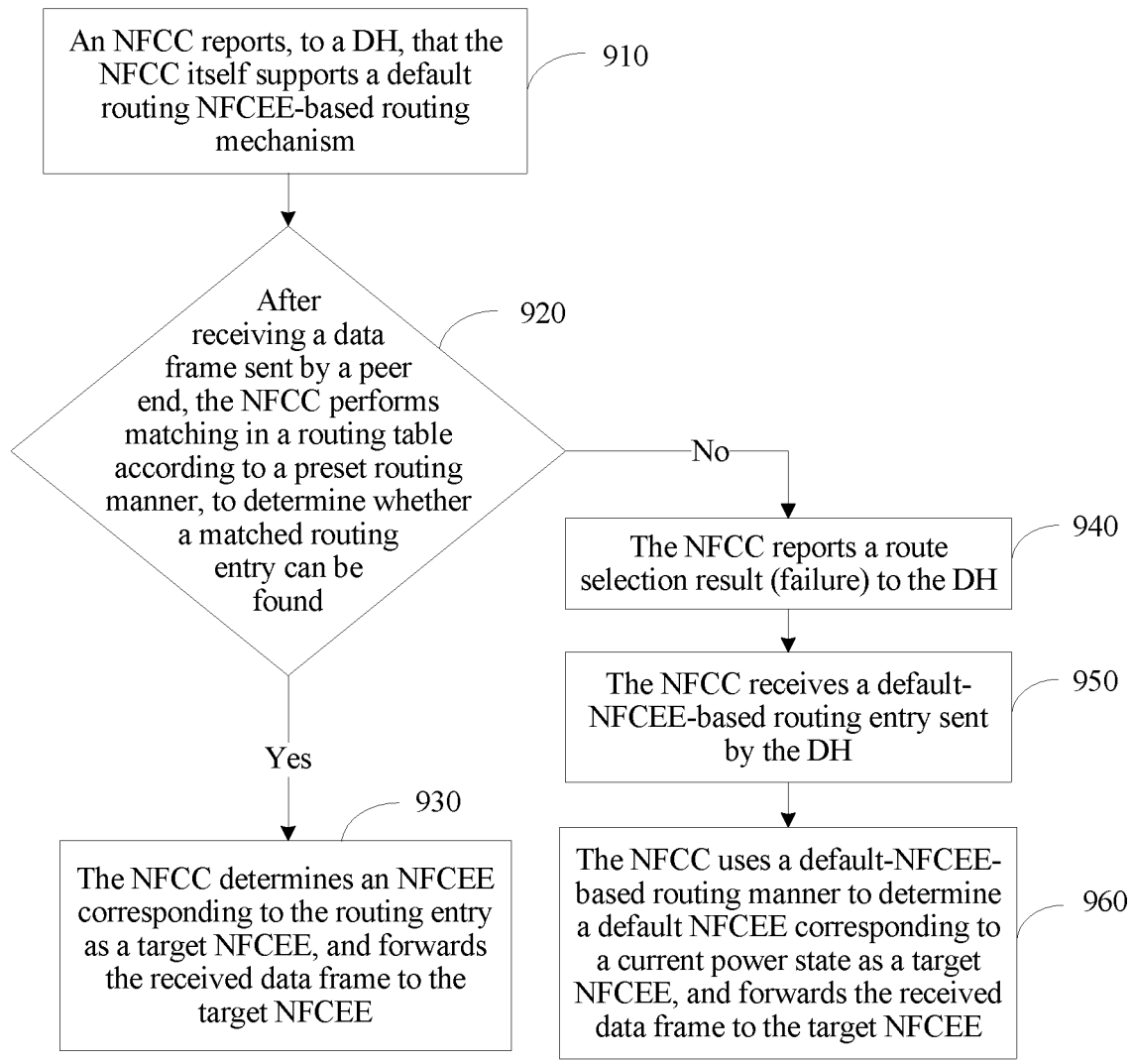
FIG. 9 is a schematic flowchart of a routing method according to another embodiment of the present invention.

FIG. 9 is a schematic flowchart of a routing method according to another embodiment of the present invention. In the embodiment shown in FIG. 9, after receiving a data frame sent by a peer end and performing route matching in a routing table according to the foregoing preset routing manners (the routing manners or the combination routing manners used in the embodiments shown in FIG. 4 to FIG. 8), an NFCC determines whether a matched routing entry can be found; if yes, the NFCC uses an NFCEE corresponding to the matched routing entry as a target NFCEE. Otherwise, the NFCC reports the route selection failure result to a device host DH, for example, the NFCC may perform reporting by using a newly defined control message RF_ROUTE_MATCHING_NTF, where information indicating a matching result is included; then, the device host DH configures a default-NFCEE-based routing entry for the NFCC after the DH determines that the NFCC supports a default-NFCEE-based routing manner; and finally, the NFCC determines a target NFCEE according to the default-NFCEE-based routing entry.

Specifically, the routing method shown in FIG. 9 includes the following steps:

910. An NFCC reports, to a DH, that the NFCC itself has a capability of supporting a default-NFCEE-based routing manner.

In other words, a device host DH determines, at an initialization stage, that an NFCC supports a default-NFCEE-based routing manner.

Specifically, step 910 is corresponding to 310 in FIG. 3. To avoid repetition, details are not described herein.

It should be noted that this step needs to be performed before the following step 950, that is, when the NFCC determines that no matched routing entry is found in a routing table by using a preset routing manner, the NFCC can report that the NFCC itself has the capability of supporting the default-NFCEE-based routing manner.

920. After receiving a data frame sent by a peer end, the NFCC performs matching in a routing table according to a preset routing manner, to determine whether a matched routing entry can be found.

Specifically, the preset routing manner includes one of or a combination of multiple of an AID-based routing manner, an APDU pattern-based routing manner, an NFCID2-based routing manner, a protocol-based routing manner, or a technology-based routing manner. If the NFCC can find the matched routing entry in the routing table according to the preset routing manner, step 930 is performed. If the NFCC finds no matched routing entry in the routing table according to the preset routing manner, step 940 is performed.

Specifically, step 920 is corresponding to 330 in FIG. 3. To avoid repetition, details are not described herein.

930. The NFCC determines an NFCEE corresponding to the routing entry as a target NFCEE, and forwards the received data frame to the target NFCEE.

940. The NFCC reports a route selection result (failure) to the DH.

Specifically, the NFCC reports the route selection failure result to the device host DH. For example, a notification message RF_ROUTE_MATCHING_NTF may be defined, where a route selection result identifier is included, and the NFCC may report, by using the notification message to the DH, that the route selection result is failure.

950. The NFCC receives a default-NFCEE-based routing entry sent by the DH.

Specifically, the NFCC receives the default-NFCEE-based routing entry configured by the DH for the NFCC after the DH determines that the NFCC supports a default routing NFCEE-based routing mechanism.

For example, the NFCC may receive an NFCEE ID of a current default routing NFCEE of which the device host DH notifies the NFCC after the DH determines that the NFCC supports the default-NFCEE-based routing manner. The device host DH may select a most appropriate NFCEE as the default routing NFCEE according to a current power state, all current NFCEE states (connected and enabled), or even all NFCEE priorities.

Specifically, step 950 is corresponding to step 320 in FIG. 3. To avoid repetition, details are not described herein.

960. The NFCC uses the default-NFCEE-based routing manner to determine a target NFCEE, and forwards the received data frame to the target NFCEE.

Specifically, step 960 is corresponding to step 350 in FIG. 3. To avoid repetition, details are not described herein.

Therefore, in this embodiment of the present invention, after finding no matched routing entry in a routing table according to a preset routing manner, an NFCC reports the route selection failure result to a DH, then acquires a default-NFCEE-based routing entry configured by the DH, and determines a target NFCEE according to a default-NFCEE-based routing manner, so that the NFCC routes a data frame to the target NFCEE. It is avoided that different NFCCs process these data frames according to different implementation manners, specific implementation complexity is simplified, and an efficient processing method is provided for the NFCC when a correct target NFCEE cannot be found by using a preset routing manner.

Figure 10:
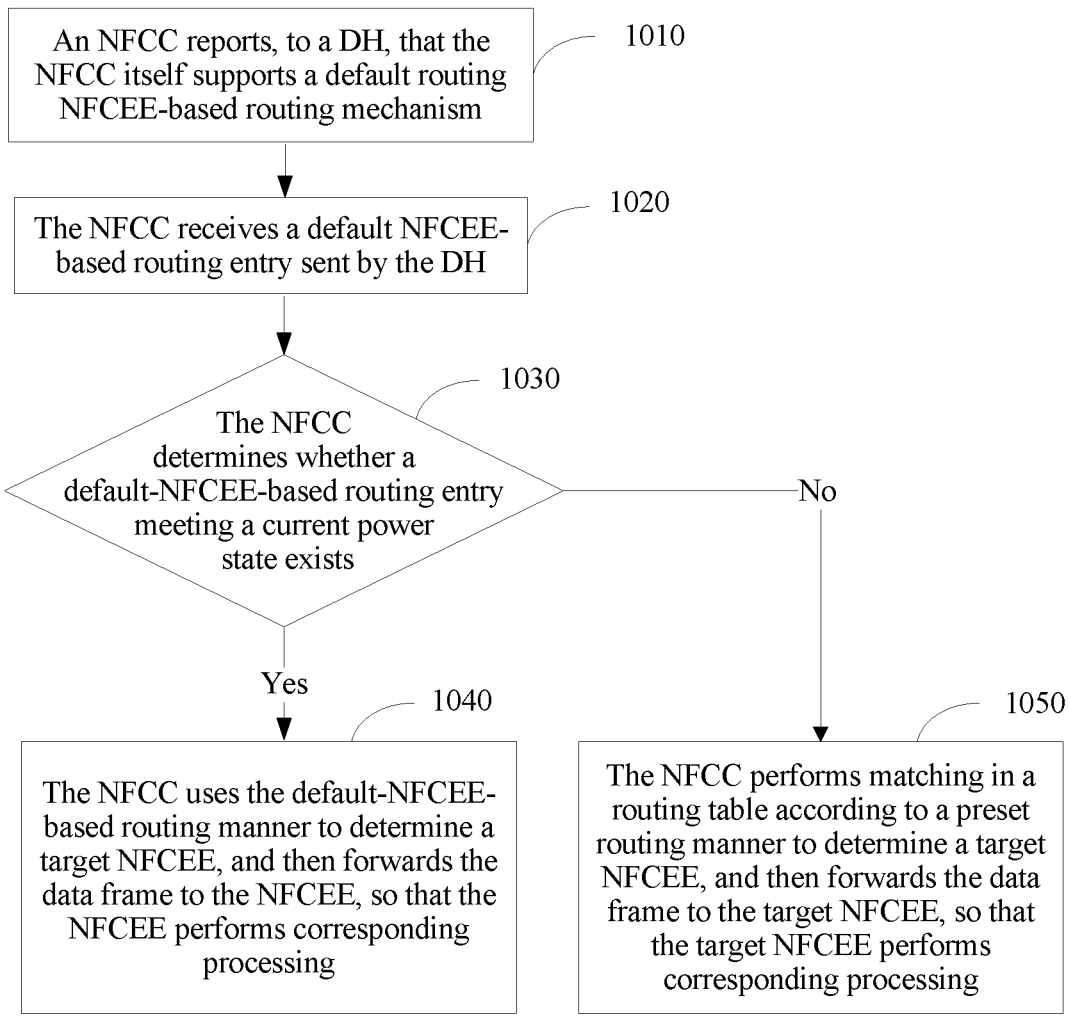
FIG. 10 is a schematic flowchart of a routing method according to another embodiment of the present invention.

FIG. 10 is a schematic flowchart of a routing method according to another embodiment of the present invention. In the embodiment shown in FIG. 10, an NFCC reports, to a DH, that the NFCC itself supports a default-NFCEE-based routing manner, so that the DH configures a default-NFCEE-based routing entry for the NFCC; and after receiving a data frame sent by a peer end, the NFCC determines whether a default-NFCEE-based routing entry (meeting a current power state) exists. If the default-NFCEE-based routing entry exists, the NFCC determines a target NFCEE according to the routing entry, and then forwards the data frame to the target NFCEE, so that the target NFCEE performs corresponding processing. If the default-NFCEE-based routing entry does not exist, the NFCC searches a routing table for a matched routing entry according to a preset routing manner to determine a target NFCEE, and then forwards the data frame to the target NFCEE, so that the target NFCEE performs corresponding processing.

Specifically, the routing method shown in FIG. 10 includes the following steps:

1010. An NFCC reports, to a DH, that the NFCC itself supports a default-NFCEE-based routing manner.

In other words, a device host DH determines, at an initialization stage, that an NFCC supports a default-NFCEE-based routing manner.

Specifically, step 1010 is corresponding to step 310 in FIG. 3. To avoid repetition, details are not described herein.

1020. The NFCC receives a default-NFCEE-based routing entry sent by the DH.

Specifically, the NFCC receives the default-NFCEE-based routing entry configured by the DH for the NFCC after the DH determines that the NFCC supports a default routing NFCEE-based routing mechanism.

For example, the NFCC may receive an NFCEE ID of a current default routing NFCEE of which the device host DH notifies the NFCC after the DH determines that the NFCC supports the default-NFCEE-based routing manner. The device host DH may select a most appropriate NFCEE as the default routing NFCEE according to a current power state, all current NFCEE states (connected and enabled), or even all NFCEE priorities.

Specifically, step 1020 is corresponding to step 320 in FIG. 3. To avoid repetition, details are not described herein.

1030. The NFCC determines whether a default-NFCEE-based routing entry meeting a current power state exists.

Specifically, if yes, step 1040 is performed; otherwise, step 1050 is performed.

In this embodiment, that power state information exists in the default-NFCEE-based routing entry is merely used as an example for description. Certainly, the NFCC may not consider the power state, but directly determine whether the default-NFCEE-based routing entry exists. Details are not described herein.

1040. The NFCC uses the default-NFCEE-based routing manner to determine a target NFCEE, and then forwards the data frame to the NFCEE, so that the NFCEE performs corresponding processing.

Specifically, step 1040 is corresponding to step 350 in FIG. 3. To avoid repetition, details are not described herein.

1050. The NFCC searches a routing table for a matched routing entry according to a preset routing manner to determine a target NFCEE, and then forwards the data frame to the target NFCEE, so that the target NFCEE performs corresponding processing.

Specifically, the preset routing manner includes one of or a combination of multiple of an AID-based routing manner, an APDU pattern-based routing manner, an NFCID2-based routing manner, a protocol-based routing manner, or a technology-based routing manner. For example, the preset routing manner may include the AID-based routing manner; the NFCID2-based routing manner; the AID-based routing manner, and one or more of the APDU pattern-based routing manner, the protocol-based routing manner, or the technology-based routing manner; or the NFCID2-based routing manner, and one or more of the protocol-based routing manner, or the technology-based routing manner. Specifically, step 1050 is corresponding to step 330 in FIG. 3. To avoid repetition, details are not described herein.

Therefore, in this embodiment of the present invention, after receiving a data frame sent by a peer device, an NFCC may directly determine whether a default-NFCEE-based routing entry exists; and if the default-NFCEE-based routing entry exists, an NFCEE corresponding to the default-NFCEE-based routing entry is directly determined as a target NFCEE. Therefore, a route selection time is shortened under a particular condition, communication efficiency is improved, specific implementation complexity is simplified, and accuracy of determining a target NFCEE may further be improved in specific implementation.

It should be noted that for all embodiments described in FIG. 3 to FIG. 10, an NFCC may use a default-NFCEE-based routing manner to determine a target NFCEE for a received data frame sent by a peer end. This operation may be started or ended by the NFCC according to a command of a DH. For example, the DH enables, by using a newly defined start command or end command, the NFCC to start or stop using the default-NFCEE-based routing manner. Whether this operation is performed may further be determined by the NFCC according to an identifier in a default-NFCEE-based routing entry configured by the DH. For example, when configuring the default-NFCEE-based routing entry, the DH may define one bit or more bits in the foregoing Table 4 or Table 7 to indicate whether the default-NFCEE-based routing entry can be used, or set an NFCEE ID in the foregoing Table 6, Table 7, Table 10, or Table 11 to a particular value (for example, 0xFF) to indicate whether the default-NFCEE-based routing entry can be used, or set at least one byte in the foregoing Table 8 to a particular identifier to indicate whether the default-NFCEE-based routing entry can be used. If the default-NFCEE-based routing entry can be used, after receiving the data frame sent by the peer end, the NFCC may use, according to any one of implementation manners shown in the foregoing FIG. 3 to FIG. 10, the default-NFCEE-based routing manner to search for a matched routing entry for the data frame.

The foregoing describes in detail the routing method according to the embodiments of the present invention with reference to FIG. 1 to FIG. 10. The following describes in detail a near field communication controller NFCC according to embodiments of the present invention with reference to FIG. 11 and FIG. 14, describes in detail a device host DH according to embodiments of the present invention with reference to FIG. 12 and FIG. 15, and describes in detail a terminal according to an embodiment of the present invention with reference to FIG. 13.

Figure 11:
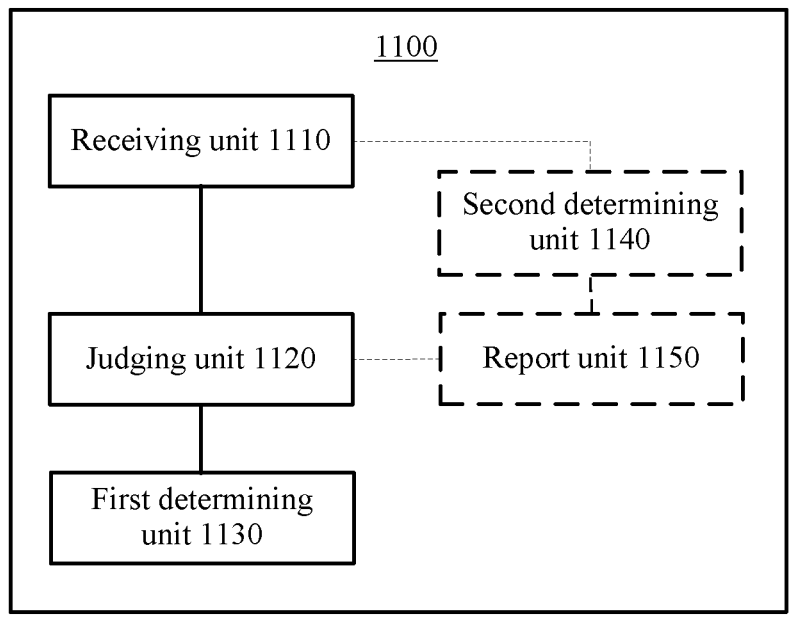
FIG. 11 is a schematic block diagram of a near field communication controller according to an embodiment of the present invention.

FIG. 11 is a schematic block diagram of a near field communication controller according to an embodiment of the present invention. The NFCC 1100 shown in FIG. 11 includes a receiving unit 1110, a judging unit 1120, and a first determining unit 1130.

Specifically, the receiving unit 1110 is configured to receive a data frame sent by a second terminal. The judging unit 1120 is configured to determine whether a default-NFCEE-based routing manner is used to search for a matched routing entry for the data frame. The first determining unit 1130 is configured to determine a target NFCEE according to the default-NFCEE-based routing manner when the judging unit determines that the default-NFCEE-based routing manner is used to search for the matched routing entry for the data frame, so that the NFCC routes the data frame to the target NFCEE.

Therefore, in this embodiment of the present invention, it is determined whether a default-NFCEE-based routing manner is used to search for a matched routing entry for a data frame, and if yes, a target NFCEE is determined according to the default-NFCEE-based routing manner, so that an NFCC routes the data frame to the target NFCEE. In this embodiment of the present invention, because the NFCC may use the default-NFCEE-based routing manner to determine the target NFCEE, it is avoided that different NFCCs process these data frames according to different implementation manners, specific implementation complexity is simplified, route selection time may further be shortened under a particular condition, communication efficiency is improved, and accuracy of determining a target NFCEE may further be improved in specific implementation.

Optionally, in another embodiment, the judging unit 1120 is specifically configured to determine whether a default-NFCEE-based routing entry exists. The first determining unit 1130 is specifically configured to determine, when the judging unit determines that the default-NFCEE-based routing entry exists, an NFCEE corresponding to the default-NFCEE-based routing entry as the target NFCEE.

Optionally, in another embodiment, the judging unit 1120 is specifically configured to determine whether a default-NFCEE-based routing entry meeting a current power state exists. The first determining unit 1130 is specifically configured to determine, when the judging unit determines that the default-NFCEE-based routing entry meeting the current power state exists, an NFCEE corresponding to the default-NFCEE-based routing entry meeting the current power state as the target NFCEE.

Optionally, in another embodiment, the current power state is one of power states, where the power states include at least one of a power-exhausted state, a power-unexhausted but switched-off state, a screen-on and screen-unlocked state, a screen-on and screen-locked state, a screen-off and screen-unlocked state, and a screen-off and screen-locked state.

Optionally, in another embodiment, the NFCC 1100 may further include a second determining unit 1140.

Specifically, the second determining unit 1140 is configured to determine, before the judging unit determines whether the default-NFCEE-based routing manner is used to search for the matched routing entry for the data frame, that no matched routing entry is found in a routing table according to a preset routing manner.

Optionally, in another embodiment, the NFCC 1100 may further include a report unit 1150.

Specifically, the report unit 1150 is configured to report a route failure message to a DH, where the route failure message indicates that the second determining unit 1140 cannot determine the target NFCEE according to the preset routing manner.

Optionally, in another embodiment, the first determining unit 1130 is further configured to determine the target NFCEE according to the preset routing manner when the judging unit 1120 determines that the default-NFCEE-based routing manner is not used to search for the matched routing entry for the data frame, so that the NFCC routes the data frame to the target NFCEE.

Optionally, in another embodiment, the preset routing manner includes: one of or a combination of multiple of an AID-based routing manner, an APDU pattern-based routing manner, an NFCID2-based routing manner, a protocol-based routing manner, or a technology-based routing manner.

Optionally, in another embodiment, the default-NFCEE-based routing entry is configured by the DH for the NFCC.

Optionally, in another embodiment, the report unit 1150 is further configured to report capability information to the DH, where the capability information includes information indicating that the NFCC supports the default-NFCEE-based routing manner.

It should be understood that the NFCC in FIG. 11 can implement processes related to the NFCC in the methods in FIG. 1 to FIG. 10. To avoid repetition, details are not described herein.

Figure 12:
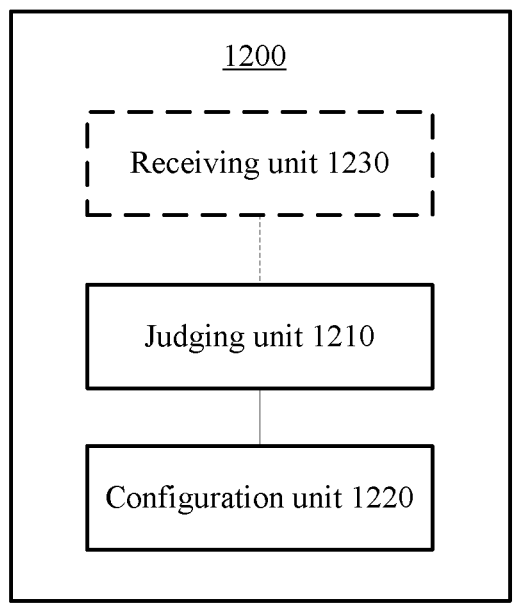
FIG. 12 is a schematic block diagram of a device host according to an embodiment of the present invention.

FIG. 12 is a schematic block diagram of a device host according to an embodiment of the present invention. The DH 1200 shown in FIG. 12 includes: a judging unit 1210 and a configuration unit 1220.

Specifically, the judging unit 1210 is configured to determine whether an NFCC has a capability of supporting a default-NFCEE-based routing manner. The configuration unit 1220 is configured to configure a default-NFCEE-based routing entry for the NFCC when the judging unit determines that the NFCC has the capability of supporting the default-NFCEE-based routing manner, so that the NFCC determines a target NFCEE according to the default-NFCEE-based routing entry.

Therefore, in this embodiment of the present invention, a DH configures a default-NFCEE-based routing entry for an NFCC, so that the NFCC determines a target NFCEE according to the default-NFCEE-based routing entry. In this embodiment of the present invention, because the NFCC may use a default-NFCEE-based routing manner to determine the target NFCEE, it is avoided that different NFCCs process these data frames according to different implementation manners, thereby reducing implementation complexity. A route selection time may further be shortened under a particular condition, communication efficiency is improved, and accuracy of determining a target NFCEE may further be improved in specific implementation.

Optionally, in another embodiment, the DH 1200 further includes a receiving unit 1230.

Specifically, the receiving unit 1230 is configured to receive capability information reported by the NFCC, where the capability information includes information indicating that the NFCC supports the default-NFCEE-based routing manner.

Optionally, in another embodiment, the configuration unit 1220 is specifically configured to configure a default-NFCEE for the NFCC, where the default-NFCEE is one of at least one NFCEE.

Optionally, in another embodiment, the configuration unit 1220 is specifically configured to configure a default-NFCEE-based routing entry for the NFCC according to a power state, where the power state includes any one of or a combination of multiple of a power-exhausted state, a power-unexhausted but switched-off state, a screen-on and screen-unlocked state, a screen-on and screen-locked state, a screen-off and screen-unlocked state, or a screen-off and screen-locked state.

Optionally, in another embodiment, the configuration unit 1220 is specifically configured to separately configure one NFCEE for at least one power state in the power state, or specifically configured to configure one NFCEE for multiple power states in the power states.

It should be understood that the DH in FIG. 12 can implement processes related to the DH in the methods in FIG. 1 to FIG. 10. To avoid repetition, details are not described herein.

Figure 13:
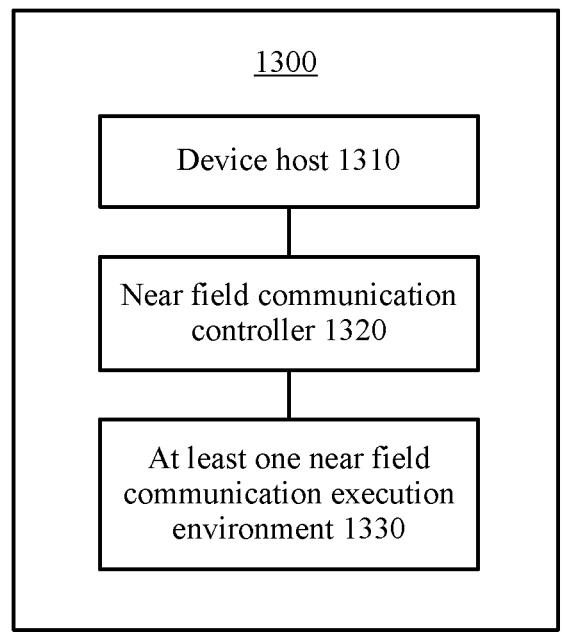
FIG. 13 is a schematic block diagram of a terminal according to an embodiment of the present invention.

FIG. 13 is a schematic block diagram of a terminal according to an embodiment of the present invention. The terminal 1300 shown in FIG. 13 includes a device host DH 1310, a near field communication controller NFCC 1320, and at least one near field communication execution environment NFCEE 1330. The DH 1310 is configured to configure a default-NFCEE-based routing entry for the NFCC 1320 after the DH 1310 determines that the NFCC 1320 has a capability of supporting a default-NFCEE-based routing manner. The NFCC 1320 is configured to receive a data frame sent by a second terminal, and determine whether the default-NFCEE-based routing manner is used to search for a matched routing entry for the data frame, and if yes, the NFCC 1320 determines a target NFCEE according to the default-NFCEE-based routing manner, so that the NFCC 1320 routes the data frame to the target NFCEE.

Therefore, in this embodiment of the present invention, an NFCC determines whether a default-NFCEE-based routing manner is used to search for a matched routing entry for a data frame, and if yes, the NFCC determines a target NFCEE according to the default-NFCEE-based routing manner, so that the NFCC routes the data frame to the target NFCEE.

Because the NFCC may use the default-NFCEE-based routing manner to determine the target NFCEE, it is avoided that different NFCCs process these data frames according to different implementation manners, the NFCC shortens a route selection time under a particular condition, communication efficiency is improved, and accuracy of determining a target NFCEE is improved in specific implementation. An efficient processing method may further be provided for the NFCC when a correct target NFCEE cannot be found by using a preset routing manner. Implementation complexity is simplified.

It should be understood that the terminal in this embodiment of the present invention may be any mobile or portable electronic device, including but not limited to a mobile telephone, a mobile computer, a tablet computer, a personal digital assistant (Personal Digital Assistant, PDA), a wearable device (Wearable Device), a combination of two or more of the foregoing, or the like.

The DH in this embodiment of the present invention may also be referred to as a processor unit or a control center, including: connecting to parts of an entire electronic device by using various interfaces and lines, and executing various functions of the electronic device and/or processing data by running or executing a software program and/or a module stored in a storage unit and by invoking data stored in the storage unit. The processor unit may include an integrated circuit (Integrated Circuit, IC for short), for example, may include a singly-encapsulated IC or may include multiple connected encapsulated ICs with a same function or different functions. For example, the processor unit may include only a central processing unit (Central Processing Unit, CPU for short), or may be a combination of a GPU, a digital signal processor (Digital Signal Processor, DSP for short), and a control chip in a communication unit (for example, a baseband chip). In an implementation manner of the present invention, the CPU may be a single-operation core, or may include a multi-operation core.

The NFCC in this embodiment of the present invention may include a communication unit, or the NFCC may be integrated with a communication unit. Certainly, the NFCC may further be a device independent from the communication unit. The communication unit is configured to establish a communication channel, so that the electronic device is connected to a remote server by using the communication channel and downloads media data from the remote server. The communication unit may include communication modules such as a wireless local area network (Wireless Local Area Network, wireless LAN for short) module, a Bluetooth module, an NFC antenna module, and a baseband (Base Band) module, and a radio frequency (Radio Frequency, RF for short) circuit corresponding to the communication modules. The communication unit is configured to perform wireless local area network communication, Bluetooth communication, NFC communication, infrared communication, and/or cellular communications system communication, for example, Wideband Code Division Multiple Access (Wideband Code Division Multiple Access, W-CDMA for short) and/or High Speed Downlink Packet Access (High Speed Downlink Packet Access, HSDPA for short). The communication module is configured to control communication between the components in the electronic device and may support direct memory access (Direct Memory Access). The radio frequency circuit is configured to receive and send information or receive and send a signal during a call. For example, after receiving downlink information of a base station, the radio frequency circuit sends the downlink information to a processing unit for processing. In addition, the radio frequency circuit sends designed uplink data to the base station. For another example, after receiving information sent by an external NFC device, the radio frequency circuit sends the information to a processing unit for processing and sends a processing result to the external NFC device. Generally, the radio frequency circuit includes a well-known circuit configured to perform these functions, which includes but is not limited to an antenna system, a radio frequency transceiver, one or more amplifiers, a tuner, one or more oscillators, a digital signal processor, a codec (Codec) chipset, a subscriber identity module (SIM) card, a memory, and the like. In addition, the radio frequency circuit may further communicate with a network and another device by means of wireless communication. The wireless communication may use any communication standard or protocol, including but not limited to a GSM (Global System of Mobile communication, Global System for Mobile communications), a GPRS (General Packet Radio Service, General Packet Radio Service), CDMA (Code Division Multiple Access, Code Division Multiple Access), WCDMA (Wideband Code Division Multiple Access, Wideband Code Division Multiple Access), High Speed Uplink Packet Access (High Speed Uplink Packet Access, HSUPA) technology, LTE (Long Term Evolution, Long Term Evolution), an email, an SMS (Short Messaging Service, Short Messaging Service), and the like.

Specifically, in this embodiment of the present invention, the NFCC may communicate with the foregoing processor unit (that is, the device host DH) by using an NCI. The NFCC may further communicate with a peer NFC device based on NFC, so that the NFCC receives a data frame sent by the peer NFC device. The NFCC further communicates with an NFCEE on based on a protocol (for example, the HCI/SWP), so that the NFCC selects an appropriate target NFCEE based on a default routing NFCEE solution configured by the device host DH, and the NFCEE receives and processes the data frame that is from the peer NFC device and forwarded by the NFCC.

It should further be understood that the terminal in this embodiment of the present invention may further include a storage unit (not shown in the figure). The storage unit may store an NFC application program installed in a DH-NFCEE or an NFCEE(s), a routing program and a routing table inside the NFCC, and the like.

Optionally, in another embodiment, the DH 1310 is specifically configured to configure a default-NFCEE for the NFCC 1320, where the default-NFCEE is one of the at least one FCEE 1330. The NFCC 1320 is specifically configured to determine whether a default-NFCEE-based routing entry exists.

Optionally, in another embodiment, the NFCC 1320 is specifically configured to determine an NFCEE corresponding to the default-NFCEE-based routing entry as the target NFCEE.

Optionally, in another embodiment, the DH 1310 is specifically configured to configure the default-NFCEE-based routing entry for the NFCC 1320 according to a power state. The NFCC 1320 is specifically configured to determine whether a default-NFCEE-based routing entry meeting a current power state exists.

Optionally, in another embodiment, the DH 1310 is configured to separately configure one NFCEE for at least one power state in the power state; or the DH 1310 configures one NFCEE for multiple power states in the power states.

Optionally, in another embodiment, the NFCC 1320 is specifically configured to determine an NFCEE corresponding to the default-NFCEE-based routing entry meeting the current power state as the target NFCEE.

Optionally, in another embodiment, the current power state is one of power states, where the power states include at least one of a power-exhausted state, a power-unexhausted but switched-off state, a screen-on and screen-unlocked state, a screen-on and screen-locked state, a screen-off and screen-unlocked state, and a screen-off and screen-locked state.

Optionally, in another embodiment, the NFCC 1320 is further configured to: determine, according to a preset routing manner, that no matched routing entry is found in a routing table; and report a route failure message to the DH 1310, where the route failure message indicates that the NFCC 1320 cannot determine the target NFCEE according to the preset routing manner.

Optionally, in another embodiment, the NFCC 1320 is further configured to determine the target NFCEE according to the preset routing manner when the NFCC 1320 determines that the default-NFCEE-based routing manner is not used to search for the matched routing entry for the data frame, so that the terminal routes the data frame to the target NFCEE.

Optionally, in another embodiment, the preset routing manner includes one of or a combination of multiple of an AID-based routing manner, an APDU pattern-based routing manner, an NFCID2-based routing manner, a protocol-based routing manner, or a technology-based routing manner.

Optionally, in another embodiment, the NFCC 1320 is further configured to report capability information to the DH 1310, and the DH 1310 is further configured to receive the capability information reported by the NFCC 1320, where the capability information includes information indicating that the NFCC 1320 supports the default-NFCEE-based routing manner.

It should be understood that the device host DH 1310 is corresponding to the DH in FIG. 12, and the near field communication controller NFCC 1320 is corresponding to the NFCC in FIG. 13. To avoid repetition, details are not described herein. The terminal may perform the routing methods described in FIG. 1 to FIG. 10. The device host DH 1310 can implement processes related to the DH in the routing methods in FIG. 1 to FIG. 10. The near field communication controller NFCC 1320 can implement processes related to the NFCC in the routing methods in FIG. 1 to FIG. 10. To avoid repetition, details are not described herein.

Figure 14:
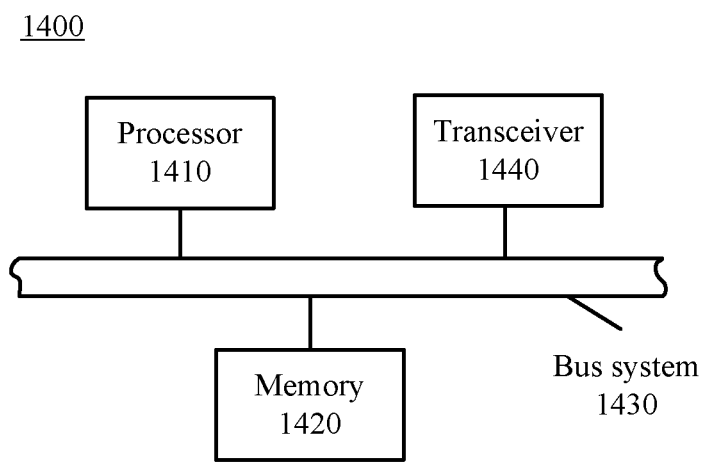
FIG. 14 is a schematic block diagram of a near field communication controller according to an embodiment of the present invention.

FIG. 14 is a schematic block diagram of a near field communication controller according to an embodiment of the present invention. As shown in FIG. 14, the near field communication controller 1400 includes a processor 1410, a memory 1420, a bus system 1430, and a transceiver 1440. The processor 1410, the memory 1420, and the transceiver 1440 are connected through the bus system 1430.

Specifically, the transceiver 1440 receives a data frame sent by a second terminal. The processor 1410 invokes, by using the bus system 1430, code stored in the memory 1420, determines whether a default-NFCEE-based routing manner is used to search for a matched routing entry for the data frame, and determines a target NFCEE according to the default-NFCEE-based routing manner when it is determined that the default-NFCEE-based routing manner is used to search for the matched routing entry for the data frame, so that an NFCC routes the data frame to the target NFCEE.

Therefore, in this embodiment of the present invention, it is determined whether a default-NFCEE-based routing manner is used to search for a matched routing entry for a data frame, and if yes, a target NFCEE is determined according to the default-NFCEE-based routing manner, so that an NFCC routes the data frame to the target NFCEE. In this embodiment of the present invention, because the NFCC may use the default-NFCEE-based routing manner to determine the target NFCEE, it is avoided that different NFCCs process these data frames according to different implementation manners, specific implementation complexity is simplified, route selection time may further be shortened under a particular condition, communication efficiency is improved, and accuracy of determining a target NFCEE may further be improved in specific implementation.

The foregoing methods disclosed in the embodiments of the present invention may be applied to the processor 1410 or implemented by the processor 1410. The processor 1410 may be an integrated circuit chip and has a signal processing capability. In an implementation process, the steps of the foregoing methods may be implemented by using an integrated logical circuit of hardware or an instruction in a form of software in the processor 1410. The foregoing processor 1410 may be a general purpose processor, a digital signal processor (English: Digital Signal Processor, DSP for short), an application-specific integrated circuit (English: Application Specific Integrated Circuit, ASIC for short), a field programmable gate array (English: Field Programmable Gate Array, FPGA for short) or another programmable logical component, a discrete gate or transistor logical device, or a discrete hardware component, which may implement or perform the methods, steps, and logical block diagrams disclosed in the embodiments of the present invention. The general purpose processor may be a microprocessor, or the processor may be any conventional processor or the like. The steps of the methods disclosed with reference to the embodiments of the present invention may be implemented directly by using a hardware decoding processor, or implemented by using a combination of hardware and software modules in the decoding processor. The software module may be located in a mature storage medium in the art such as a random access memory (English: Random Access Memory, RAM for short), a flash memory, a read-only memory (English: Read-Only Memory, ROM for short), a programmable read-only memory, an electrically erasable programmable memory, or a register. The storage medium is located in the memory 1420. The processor 1410 reads information in the memory 1420 and implements the steps of the foregoing methods in combination with hardware of the processor 1410. In addition to a data bus, the bus system 1430 may further include a power bus, a control bus, a status signal bus, and the like. However, for ease of clear description, various buses are denoted as the bus system 1430 in the figure.

Optionally, in another embodiment, the processor 1410 determines whether a default-NFCEE-based routing entry exists, and determines, if it is determined that the default-NFCEE-based routing entry exists, an NFCEE corresponding to the default-NFCEE-based routing entry as the target NFCEE.

Optionally, in another embodiment, the processor 1410 determines whether a default-NFCEE-based routing entry meeting a current power state exists, and determines, if it is determined that the default-NFCEE-based routing entry meeting the current power state exists, an NFCEE corresponding to the default-NFCEE-based routing entry meeting the current power state as the target NFCEE.

Optionally, in another embodiment, the current power state is one of power states, where the power states include at least one of a power-exhausted state, a power-unexhausted but switched-off state, a screen-on and screen-unlocked state, a screen-on and screen-locked state, a screen-off and screen-unlocked state, and a screen-off and screen-locked state.

Optionally, in another embodiment, the processor 1410 determines, before the processor 1410 determines whether the default-NFCEE-based routing manner is used to search for the matched routing entry for the data frame, that no matched routing entry is found in a routing table according to a preset routing manner.

Optionally, in another embodiment, the transceiver 1440 may report a route failure message to a DH by using an NFC control interface, where the route failure message indicates that the processor 1410 cannot determine the target NFCEE according to the preset routing manner.

Optionally, in another embodiment, the determining, by the processor 1410, whether a default-NFCEE-based routing manner is used to search for a matched routing entry for the data frame further includes: determining the target NFCEE according to the preset routing manner when the processor 1410 determines that the default-NFCEE-based routing manner is not used to search for the matched routing entry for the data frame, so that the NFCC routes the data frame to the target NFCEE.

Optionally, in another embodiment, the preset routing manner includes one of or a combination of multiple of an AID-based routing manner, an APDU pattern-based routing manner, an NFCID2-based routing manner, a protocol-based routing manner, or a technology-based routing manner.

Optionally, in another embodiment, the default-NFCEE-based routing entry is configured by the DH for the NFCC.

Optionally, in another embodiment, the transceiver 1440 may report capability information to the DH by using the NFC control interface, where the capability information includes information indicating that the NFCC supports the default-NFCEE-based routing manner.

The foregoing methods disclosed in the embodiments of the present invention may be applied to the transceiver 1440 or implemented by the transceiver 1440. The transceiver 1440 may include a transmit circuit and a receive circuit, or include a communications interface, or include an antenna, or include an antenna to which a transmit circuit and a receive circuit are coupled. The transceiver 1440 may further be an integrated circuit chip and has a signal receiving and sending capability. In an implementation process, the steps of the foregoing methods may be implemented by using an integrated logical circuit of hardware or an instruction in a form of software in the processor 1410. For example, when the NFCC receives, by using the transceiver 1440, the data frame sent by the second terminal, the transceiver 1440 is generally a radio frequency circuit implementing NFC communication with an external NFC device. For another example, when the NFCC reports a route failure message or capability information to the DH by using the transceiver 1440, the transceiver 1440 is generally a circuit implementing communication between the DH and the NFCC inside a first terminal.

It should be understood that the NFCC in FIG. 14 can implement processes related to the NFCC in the methods in FIG. 1 to FIG. 10. To avoid repetition, details are not described herein.

Figure 15:
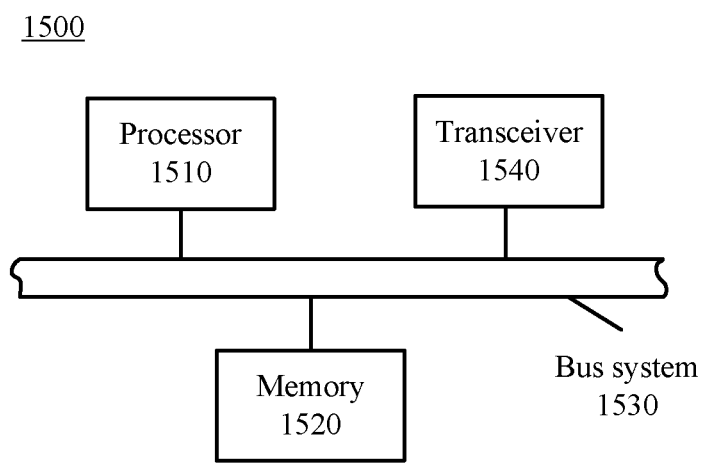
FIG. 15 is a schematic block diagram of a device host according to an embodiment of the present invention.

FIG. 15 is a schematic block diagram of a device host according to an embodiment of the present invention. The DH 1200 shown in FIG. 12 includes a processor 1510, a memory 1520, a bus system 1530, and a transceiver 1540. The processor 1510, the memory 1520, and the transceiver 1540 are connected through the bus system 1530.

Specifically, the processor 1510 invokes, by using the bus system 1530, code stored in the memory 1520, determines whether an NFCC has a capability of supporting a default-NFCEE-based routing manner, and configures, when it is determined that the NFCC has the capability of supporting the default-NFCEE-based routing manner, a default-NFCEE-based routing entry for the NFCC by using the transceiver 1540, so that the NFCC determines a target NFCEE according to the default-NFCEE-based routing entry.

Therefore, in this embodiment of the present invention, a DH configures a default-NFCEE-based routing entry for an NFCC, so that the NFCC determines a target NFCEE according to the default-NFCEE-based routing entry. In this embodiment of the present invention, because the NFCC may use a default-NFCEE-based routing manner to determine the target NFCEE, it is avoided that different NFCCs process these data frames according to different implementation manners, thereby reducing implementation complexity. A route selection time may further be shortened under a particular condition, communication efficiency is improved, and accuracy of determining a target NFCEE may further be improved in specific implementation.

The foregoing methods disclosed in the embodiments of the present invention may be applied to the processor 1510 or implemented by the processor 1510. The processor 1510 may be an integrated circuit chip and has a signal processing capability. In an implementation process, the steps of the foregoing methods may be implemented by using an integrated logical circuit of hardware or an instruction in a form of software in the processor 1510. The foregoing processor 1510 may be a general purpose processor, a digital signal processor (English: Digital Signal Processor, DSP for short), an application-specific integrated circuit (English: Application Specific Integrated Circuit, ASIC for short), a field programmable gate array (English: Field Programmable Gate Array, FPGA for short) or another programmable logical component, a discrete gate or transistor logical device, or a discrete hardware component, which may implement or perform the methods, steps, and logical block diagrams disclosed in the embodiments of the present invention. The general purpose processor may be a microprocessor, or the processor may be any conventional processor or the like. The steps of the methods disclosed with reference to the embodiments of the present invention may be implemented directly by using a hardware decoding processor, or implemented by using a combination of hardware and software modules in the decoding processor. The software module may be located in a mature storage medium in the art such as a random access memory (English: Random Access Memory, RAM for short), a flash memory, a read-only memory (English: Read-Only Memory, ROM for short), a programmable read-only memory, an electrically erasable programmable memory, or a register. The storage medium is located in the memory 1520. The processor 1510 reads information in the memory 1520 and implements the steps of the foregoing methods in combination with hardware of the processor 1510. In addition to a data bus, the bus system 1530 may further include a power bus, a control bus, a status signal bus, and the like. However, for ease of clear description, all buses in the figure are marked as the bus system 1530.

The foregoing methods disclosed in the embodiments of the present invention may be applied to the transceiver 1540 or implemented by the transceiver 1540. The transceiver 1540 may include a transmit circuit and a receive circuit, or include a communications interface, or include an antenna, or include an antenna to which a transmit circuit and a receive circuit are coupled. The transceiver 1540 may further be an integrated circuit chip and has a signal receiving and sending capability. In an implementation process, the steps of the foregoing methods may be implemented by using an integrated logical circuit of hardware or an instruction in a form of software in the processor 1510. For example, when the NFCC receives, by using the transceiver 1540, a data frame sent by a second terminal, the transceiver 1540 is generally a radio frequency circuit implementing NFC communication with an external NFC device. For another example, when the NFCC reports a route failure message or capability information to the DH by using the transceiver 1540, the transceiver 1540 is generally a circuit implementing communication between the DH and the NFCC inside a first terminal.

Optionally, in another embodiment, the transceiver 1510 may receive, by using an NFC control interface, capability information reported by the NFCC, where the capability information includes information indicating that the NFCC supports the default-NFCEE-based routing manner.

Optionally, in another embodiment, the processor 1510 configures a default-NFCEE for the NFCC, where the default-NFCEE is one of at least one NFCEE.

Optionally, in another embodiment, the processor 1510 configures the default-NFCEE-based routing entry for the NFCC according to a power state, where the power state includes any one of or a combination of multiple of a power-exhausted state, a power-unexhausted but switched-off state, a screen-on and screen-unlocked state, a screen-on and screen-locked state, a screen-off and screen-unlocked state, or a screen-off and screen-locked state.

Optionally, in another embodiment, the processor 1510 separately configures one NFCEE for at least one power state in the power state, or is specifically configured to configure one NFCEE for multiple power states in the power states.

It should be understood that the DH in FIG. 12 can implement processes related to the DH in the methods in FIG. 1 to FIG. 10. To avoid repetition, details are not described herein.

It should be noted that the foregoing examples are only intended to help a person skilled in the art to better understand the embodiments of the present invention, but not to limit the scope of the embodiments of the present invention. Apparently, a person skilled in the art may make various equivalent modifications or changes according to the foregoing provided examples. These modifications or changes also fall within the scope of the embodiments of the present invention.

It should be understood that, sequence numbers of the foregoing processes do not mean execution sequences. The execution sequences of the processes should be determined according to functions and internal logic of the processes, and should not be construed as any limitation on the implementation processes of the embodiments of the present invention.

It should be understood that "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according only to A; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a specific working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely examples of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A routing method used in a first terminal, the first terminal comprising a device host (DH), a near field communication controller (NFCC), and at least one near field communication execution environment (NFCEE), the method comprising:
   receiving, by the NFCC, a first data frame from a second terminal;
   determining, by the NFCC, whether a default-NFCEE-based routing manner is used to search for a first matched routing entry for the first data frame;
   in response to determining the default-NFCEE-based routing manner is used to search for the first matched routing entry for the first data frame, selecting, by the NFCC, a first NFCEE as a first target NFCEE according to the default-NFCEE-based routing manner, so that the NFCC routes the first data frame to the first target NFCEE;
   receiving, by the NFCC, a second data frame from the second terminal;
   determining, by the NFCC, whether the default-NFCEE-based routing manner is used to search for a second matched routing entry for the second data frame; and
   in response to determining the default-NFCEE-based routing manner is not used to search for the second matched routing entry for the second data frame, selecting, by the NFCC, a second NFCEE as a second target NFCEE according to a first routing manner that is different from the default-NFCEE-based routing manner, so that the NFCC routes the second data frame to the second target NFCEE, the first routing manner comprising an Application Identifier based (AID-based) routing manner, an Application Protocol Data Unit based (APDU-based) routing manner, an NFC device identifier (NFCID2) routing manner, a protocol-based routing manner, or a technology-based routing manner.

2. The method according to claim 1, wherein the determining, by the NFCC, whether the default-NFCEE-based routing manner is used to search for the first matched routing entry for the first data frame comprises:
   determining, by the NFCC, whether a first default-NFCEE-based routing entry exists.

3. The method according to claim 2, wherein the selecting, by the NFCC, the first target NFCEE according to the default-NFCEE-based routing manner comprises:
   selecting, by the NFCC, the first NFCEE corresponding to the first default-NFCEE-based routing entry as the first target NFCEE.

4. The method according to claim 1, wherein the determining, by the NFCC, whether the default-NFCEE-based routing manner is used to search for the first matched routing entry for the first data frame comprises:
   determining, by the NFCC, whether a first default-NFCEE-based routing entry meeting a current power state exists.

5. The method according to claim 4, wherein the selecting, by the NFCC, the first target NFCEE according to the default-NFCEE-based routing manner comprises:
   selecting, by the NFCC, the first NFCEE corresponding to the first default-NFCEE-based routing entry meeting the current power state as the first target NFCEE.

6. The method according to claim 4, wherein the current power state is one of multiple power states, and wherein the multiple power states comprise at least one of a power-exhausted state, a power-unexhausted but switched-off state, a screen-on and screen-unlocked state, a screen-on and screen-locked state, a screen-off and screen-unlocked state, or a screen-off and screen-locked state.

7. The method according to claim 1, wherein, before the determining, by the NFCC, whether the default-NFCEE-based routing manner is used to search for the first matched routing entry for the first data frame, the method further comprises:
   finding, by the NFCC, no first matched routing entry in a routing table according to a preset routing manner.

8. The method according to claim 7, wherein the method further comprises:
   reporting, by the NFCC, a route failure message to the DH, wherein the route failure message indicates that the NFCC cannot determine the first target NFCEE according to the preset routing manner.

9. A routing method used in a first terminal, the first terminal comprising a device host (DH), a near field communication controller (NFCC), and at least one near field communication execution environment (NFCEE), the method comprising:

determining, by the DH, whether the NFCC has a capability of supporting a first default-NFCEE-based routing manner;

in response to the NFCC having the capability of supporting the first default-NFCEE-based routing manner, configuring, by the DH, a default-NFCEE-based routing entry for the NFCC, so that the NFCC determines a first target NFCEE according to the first default-NFCEE-based routing entry;

determining, by the DH, whether the NFCC has a capability of supporting a second default-NFCEE-based routing manner; and in response to the NFCEE not having the capability of supporting the second default-NFCEE-based routing manner, configuring, by the DH, a first routing entry for the NFCC that is different from the second default-NFCEE-based routing manner, so that the NFCC determines a second NFCEE as a second target NFCEE according to the first routing entry using a first routing manner, the first routing manner comprising an Application Identifier based (AID-based) routing manner, an Application Protocol Data Unit based (APDU-based) routing manner, an NFC device identifier (NFCID2) routing manner, a protocol-based routing manner, or a technology-based routing manner.

10. The method according to claim 9, before the determining, by the DH, whether the NFCC has the capability of supporting the first default-NFCEE-based routing manner, further comprising:

receiving, by the DH, capability information reported by the NFCC, wherein the capability information comprises information indicating that the NFCC supports the first default-NFCEE-based routing manner.

11. The method according to claim 9, wherein the configuring, by the DH, the first default-NFCEE-based routing entry for the NFCC comprises:

configuring, by the DH, a first default-NFCEE for the NFCC, wherein the first default-NFCEE is one of the at least one NFCEE.

12. The method according to claim 9, wherein the configuring, by the DH, the first default-NFCEE-based routing entry for the NFCC comprises:

configuring, by the DH, the first default-NFCEE-based routing entry for the NFCC according to a power state, wherein the power state comprises any one of or a combination of multiple of a power-exhausted state, a power-unexhausted but switched-off state, a screen-on and screen-unlocked state, a screen-on and screen-locked state, a screen-off and screen-unlocked state, or a screen-off and screen-locked state.

13. The method according to claim 12, wherein the configuring, by the DH, the first default-NFCEE-based routing entry for the NFCC according to the power state comprises:

separately configuring, by the DH, one NFCEE for at least one power state in the power state; or configuring, by the DH, the one NFCEE for multiple power states in the power states.

14. A system, comprising:

a processor; and a non-transitory computer readable storage medium storing a program for execution by the processor, the program including instructions to:

receive a data frame from a second terminal;

determine whether to use a default-near field communication execution environment (NFCEE)-based routing manner to search for a matched routing entry for the data frame;

in response to determining to use the default-NFCEE-based routing manner to search for the matched routing entry for the data frame, select a first NFCEE as a target NFCEE according to the default-NFCEE-based routing manner, so that a near field communication controller (NFCC) routes the data frame to the target NFCEE; and in response to determining not to use the default-NFCEE-based routing manner to search for the matched routing entry for the data frame, select, by the NFCC, a second NFCEE as the target NFCEE according to a first routing manner that is different from the default-NFCEE-based routing manner, so that the NFCC routes the data frame to the target NFCEE, the first routing manner comprising an Application Identifier-based (AID-based) routing manner, an Application Protocol Data Unit-based (APDU-based) routing manner, an NFC device identifier (NFCID2) routing manner, a protocol-based routing manner, or a technology-based routing manner.

15. The system according to claim 14, wherein the instructions further comprise instructions to:

determine whether a default-NFCEE-based routing entry exists; and select the first NFCEE corresponding to the default-NFCEE-based routing entry as the target NFCEE, in response to determining that the default-NFCEE-based routing entry exists.

16. The system according to claim 15, wherein the instructions further comprise instructions to:

determine whether the default-NFCEE-based routing entry meets a current power state exists; and select the first NFCEE corresponding to the default-NFCEE-based routing entry that meets the current power state as the target NFCEE, in response to determining that the default-NFCEE-based routing entry meets the current power state exists.

17. The system according to claim 16, wherein the current power state is selected from the group consisting of a power-exhausted state, a power-unexhausted but switched-off state, a screen-on and screen-unlocked state, a screen-on and screen-locked state, a screen-off and screen-unlocked state, or a screen-off and screen-locked state.

18. The system according to claim 14, wherein the instructions further comprise instructions to:

determine that no matched routing entry in a routing table is found according to a preset routing manner, before determining whether to use the default-NFCEE-based routing manner to search for the matched routing entry for the data frame.

19. The system according to claim 18, wherein the instructions further comprise instructions to:

report a route failure message to a device host (DH), wherein the route failure message indicates that the NFCC has not selected the target NFCEE according to the preset routing manner.

20. The system according to claim 18, wherein the instructions further comprise instructions to:

select the target NFCEE according to the preset routing manner, so that the NFCC routes the data frame to the target NFCEE, in response to determining that the default-NFCEE-based routing manner is not used to search for the matched routing entry for the data frame.

* * * * *